(12) United States Patent
Zhang et al.

(10) Patent No.: US 12,015,987 B2
(45) Date of Patent: Jun. 18, 2024

(54) POWER HEADROOM REPORTS ASSUMING HALF DUPLEX AND/OR FULL DUPLEX

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 256 days.

(21) Appl. No.: 17/491,353

(22) Filed: Sep. 30, 2021

(65) Prior Publication Data
US 2022/0110072 A1   Apr. 7, 2022

Related U.S. Application Data

(60) Provisional application No. 63/086,887, filed on Oct. 2, 2020, provisional application No. 63/087,074, filed on Oct. 2, 2020.

(51) Int. Cl.
*H04B 7/00* (2006.01)
*H04W 52/14* (2009.01)
*H04W 52/36* (2009.01)

(52) U.S. Cl.
CPC ....... *H04W 52/365* (2013.01); *H04W 52/146* (2013.01); *H04W 52/367* (2013.01)

(58) Field of Classification Search
CPC ............. H04W 52/365; H04W 52/143; H04W 52/146; H04W 52/367
See application file for complete search history.

(56) References Cited

U.S. PATENT DOCUMENTS 10,051,580 B2 *  8/2018  Kim ................... H04W 52/18
10,542,536 B2 *  1/2020  Dinan ................. H04L 1/1812
(Continued)

FOREIGN PATENT DOCUMENTS

EP       3266145 A1    1/2018

OTHER PUBLICATIONS

"3rd Generation Partnership Project, Technical Specification Group Radio Access Network, Evolved Universal Terrestrial Radio Access (E-UTRA), Radio Resource Control (RRC), Protocol specification (Release 16)", 3GPP Draft, Draft_36331-G20_V2, 3rd Generation Partnership Project (3GPP), Mobile Competence Centre, 650, Route Des Lucioles, F-06921 Sophia-Antipolis Cedex, France, Oct. 1, 2020 (Oct. 1, 2020), 3GPP TS 36.331 V16.2.0 (Sep. 2020), 1080 Pages, XP051937061.
(Continued)

*Primary Examiner* — Tuan Pham
(74) *Attorney, Agent, or Firm* — Patterson + Sheridan, LLP

(57) ABSTRACT

Certain aspects of the present disclosure provide techniques for wireless communications. An example method generally includes calculating a first power headroom report (PHR) for a half duplex (HD) operating mode, calculating a second PHR for a full duplex (FD) operating mode during which maximum uplink transmit power is subject to one or more self-interference constraints, determining whether to report the first PHR, the second PHR, or both, and reporting at least one of the first PHR or the second PHR to a network entity, in accordance with the determination.

14 Claims, 22 Drawing Sheets

(56) References Cited

U.S. PATENT DOCUMENTS 10,595,279 B2 * 3/2020 Tang .................. H04W 52/243
2017/0302337 A1 10/2017 Liu et al.

OTHER PUBLICATIONS

International Search Report and Written Opinion—PCT/US2021/053211—ISA/EPO—dated Jan. 26, 2022.

* cited by examiner

Full- duplex UE only (w/MultiTRP)

POWER HEADROOM REPORTS ASSUMING HALF DUPLEX AND/OR FULL DUPLEX

CROSS-REFERENCE TO RELATED APPLICATIONS

This application claims the benefit of and priority to U.S. Provisional Application No. 63/087,074 filed Oct. 2, 2020, and U.S. Provisional Application No. 63/086,887 filed Oct. 2, 2020, both of which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for determining reporting power headroom reports (PHR) associated with full duplex (FD) and/or half-duplex (HD) operating modes.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications that may be performed by a user equipment (UE). The method generally includes calculating a first power headroom report (PHR) for a half duplex (HD) operating mode, calculating a second PHR for a full duplex (FD) operating mode during which maximum uplink transmit power is subject to one or more self-interference constraints, determining whether to report the first PHR, the second PHR, or both, and reporting at least one of the first PHR or the second PHR to a network entity, in accordance with the determination.

Certain aspects provide a method for wireless communications that may be performed by a user equipment (UE). The method generally includes calculating a PHR for a FD operating mode during which a maximum uplink transmit power is subject to one or more self-interference constraints, and sending, to a network entity, a request to abort the FD operating mode if the PHR indicates a value that is equal to or less than a first threshold value.

Certain aspects provide a method for wireless communications that may be performed by a network entity, such as a BS, gNB, etc. The method generally includes determining whether a UE is to report a first PHR for a HD operating mode, a second PHR for a FD operating mode during which maximum uplink transmit power is subject to one or more self-interference constraints, or both, and monitoring for at least one of the first PHR or the second PHR, in accordance with the determination.

Certain aspects provide a method for wireless communications that may be performed by a network entity, such as a BS, gNB, etc. The method generally includes receiving, from a UE, a request to abort a FD operating mode during which a maximum uplink transmit power is subject to one or more self-interference constraints, and determining, based on the request, that a PHR for the FD operating mode indicates a value that is equal to or less than a threshold value.

Certain aspects provide a user equipment (UE). The UE generally includes at least one antenna; at least one processor; and a memory coupled to the processor, wherein the memory stores codes executable by the at least one processor to: calculate a first power headroom report (PHR) for a half duplex (HD) operating mode, calculate a second PHR for a full duplex (FD) operating mode during which maximum uplink transmit power is subject to one or more self-interference constraints, determine whether to report the first PHR, the second PHR, or both, and report, via the at least one antenna, at least one of the first PHR or the second PHR to a network entity, in accordance with the determination.

Certain aspects provide a user equipment (UE). The UE generally includes at least one processor; a memory coupled to the processor, wherein the memory stores codes executable by the at least one processor to calculate a power headroom report (PHR) for a full duplex (FD) operating mode during which a maximum uplink transmit power is subject to one or more self-interference constraints; and a transmitter configured to transmit, to a network entity, a request to abort the FD operating mode if the PHR indicates a value that is equal to or less than a first threshold value.

Certain aspects provide a network entity. The network entity generally includes at least one antenna; at least one processor; and a memory coupled to the processor, wherein the memory stores codes executable by the at least one processor to: determine whether a user equipment (UE) is to report a first power headroom report (PHR) for a half duplex (HD) operating mode, a second PHR for a full duplex (FD) operating mode during which maximum uplink transmit power is subject to one or more self-interference constraints, or both, and monitor, via the at least one antenna, for at least one of the first PHR or the second PHR, in accordance with the determination.

Certain aspects provide a network entity. The network entity generally includes a receiver configured to receive, from a user equipment (UE), a request to abort a full duplex (FD) operating mode during which a maximum uplink transmit power is subject to one or more self-interference constraints; at least one processor; and a memory coupled to the processor, wherein the memory stores codes executable by the at least one processor to determine, based on the request, that a power headroom report (PHR) for the FD operating mode indicates a value that is equal to or less than a threshold value.

Certain aspects provide a user equipment (UE). The UE generally includes means for calculating a first power headroom report (PHR) for a half duplex (HD) operating mode; means for calculating a second PHR for a full duplex (FD) operating mode during which maximum uplink transmit power is subject to one or more self-interference constraints; means for determining whether to report the first PHR, the second PHR, or both; and means for reporting at least one of the first PHR or the second PHR to a network entity, in accordance with the determination.

Certain aspects provide a user equipment (UE). The UE generally includes means for calculating a power headroom report (PHR) for a full duplex (FD) operating mode during which a maximum uplink transmit power is subject to one or more self-interference constraints; and means for sending, to a network entity, a request to abort the FD operating mode if the PHR indicates a value that is equal to or less than a first threshold value.

Certain aspects provide a network entity. The network entity generally includes means for determining whether a user equipment (UE) is to report a first power headroom report (PHR) for a half duplex (HD) operating mode, a second PHR for a full duplex (FD) operating mode during which maximum uplink transmit power is subject to one or more self-interference constraints, or both; and means for monitoring for at least one of the first PHR or the second PHR, in accordance with the determination.

Certain aspects provide a network entity. The network entity generally includes means for receiving, from a user equipment (UE), a request to abort a full duplex (FD) operating mode during which a maximum uplink transmit power is subject to one or more self-interference constraints; and means for determining, based on the request, that a power headroom report (PHR) for the FD operating mode indicates a value that is equal to or less than a threshold value.

Certain aspects provide an apparatus for wireless communications that may be performed by a user equipment (UE). The apparatus generally includes at least one processor; and a memory coupled to the processor, wherein the memory stores codes executable by the at least one processor to calculate a first power headroom report (PHR) for a half duplex (HD) operating mode, calculate a second PHR for a full duplex (FD) operating mode during which maximum uplink transmit power is subject to one or more self-interference constraints, determine whether to report the first PHR, the second PHR, or both, and report at least one of the first PHR or the second PHR to a network entity, in accordance with the determination.

Certain aspects provide an apparatus for wireless communications that may be performed by a user equipment (UE). The apparatus generally includes at least one processor; a memory coupled to the processor, wherein the memory stores codes executable by the at least one processor to calculate a power headroom report (PHR) for a full duplex (FD) operating mode during which a maximum uplink transmit power is subject to one or more self-interference constraints; and an interface configured to output, for transmission to a network entity, a request to abort the FD operating mode if the PHR indicates a value that is equal to or less than a first threshold value.

Certain aspects provide an apparatus for wireless communications that may be performed by a network entity. The apparatus generally includes at least one processor; and a memory coupled to the processor, wherein the memory stores codes executable by the at least one processor to determine whether a user equipment (UE) is to report a first power headroom report (PHR) for a half duplex (HD) operating mode, a second PHR for a full duplex (FD) operating mode during which maximum uplink transmit power is subject to one or more self-interference constraints, or both, and monitor for at least one of the first PHR or the second PHR, in accordance with the determination.

Certain aspects provide an apparatus for wireless communications that may be performed by a network entity. The apparatus generally includes an interface configured to obtain, from a user equipment (UE), a request to abort a full duplex (FD) operating mode during which a maximum uplink transmit power is subject to one or more self-interference constraints; at least one processor; and a memory coupled to the processor, wherein the memory stores codes executable by the at least one processor to determine, based on the request, that a power headroom report (PHR) for the FD operating mode indicates a value that is equal to or less than a threshold value.

Certain aspects provide a computer-readable medium for wireless communications that may be performed by a UE. The computer-readable medium generally includes codes executable to calculate a first power headroom report (PHR) for a half duplex (HD) operating mode; calculate a second PHR for a full duplex (FD) operating mode during which maximum uplink transmit power is subject to one or more self-interference constraints; determine whether to report the first PHR, the second PHR, or both; and report at least one of the first PHR or the second PHR to a network entity, in accordance with the determination.

Certain aspects provide a computer-readable medium for wireless communications that may be performed by a UE. The computer-readable medium generally includes codes executable to calculate a power headroom report (PHR) for a full duplex (FD) operating mode during which a maximum uplink transmit power is subject to one or more self-interference constraints; and output, for transmission to a network entity, a request to abort the FD operating mode if the PHR indicates a value that is equal to or less than a first threshold value.

Certain aspects provide a computer-readable medium for wireless communications that may be performed by a network entity. The computer-readable medium generally includes codes executable to determine whether a user equipment (UE) is to report a first power headroom report (PHR) for a half duplex (HD) operating mode, a second PHR for a full duplex (FD) operating mode during which maximum uplink transmit power is subject to one or more self-interference constraints, or both; and monitor for at least one of the first PHR or the second PHR, in accordance with the determination.

Certain aspects provide a computer-readable medium for wireless communications that may be performed by a network entity. The computer-readable medium generally includes codes executable to obtain, from a user equipment (UE), a request to abort a full duplex (FD) operating mode during which a maximum uplink transmit power is subject to one or more self-interference constraints; and determine, based on the request, that a power headroom report (PHR) for the FD operating mode indicates a value that is equal to or less than a threshold value.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
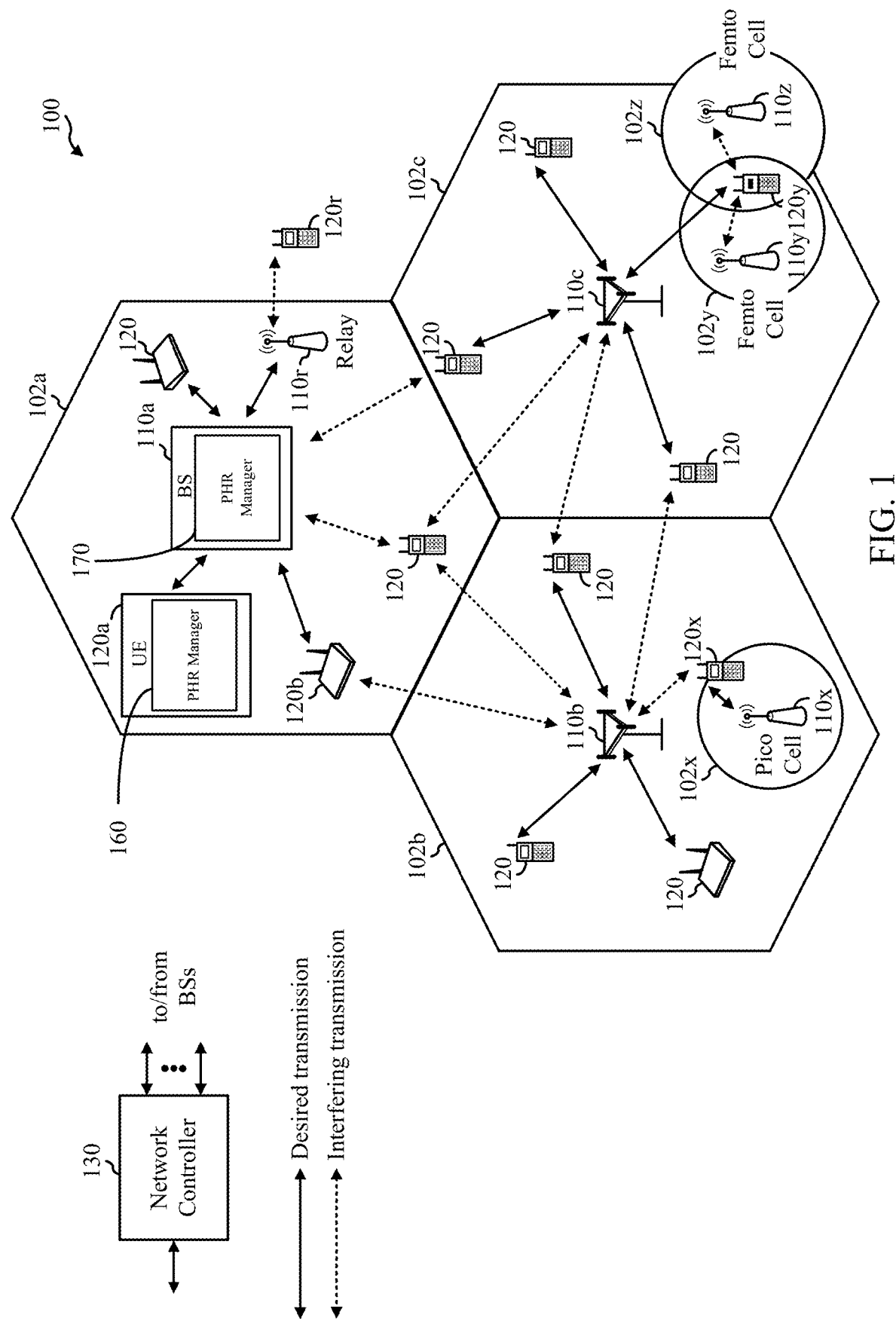
FIG. 1 is a block diagram conceptually illustrating an example telecommunications system, in accordance with certain aspects of the present disclosure.

Aspects of the present disclosure provide apparatus, methods, processing systems, and computer readable mediums for determining reporting power headroom reports (PHR) associated with full duplex (FD) and/or half-duplex (HD) operating modes.

In some cases, a UE may support calculating two PHRs: one for HD mode and one for FD mode. This may be beneficial because the PHR may be different, depending on the mode. For example, for FD mode, the maximum uplink transmit power may be limited by self-interference (SI) value and an SI threshold. Enabling a UE to provide a report appropriate to a current operating mode may, thus, be beneficial and lead to more optimal transmit power control.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be a full-duplex NR system (e.g., a full-duplex 5G network). As shown in FIG. 1, the UE 120a has a PHR manager 160 which is configured to implement one or more techniques described herein (e.g., the operations 1100 of FIG. 11, the operations 1300 of FIG. 13, and/or the operations 1500 of FIG. 15). Similarly, as shown in FIG. 1, the BS 110a has a PHR manager 170, which is configured to implement one or more techniques described herein (e.g., the operations 1200 of FIG. 12, the operations 1400 of FIG. 14, and/or the operations 1600 of FIG. 16).

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120b, 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
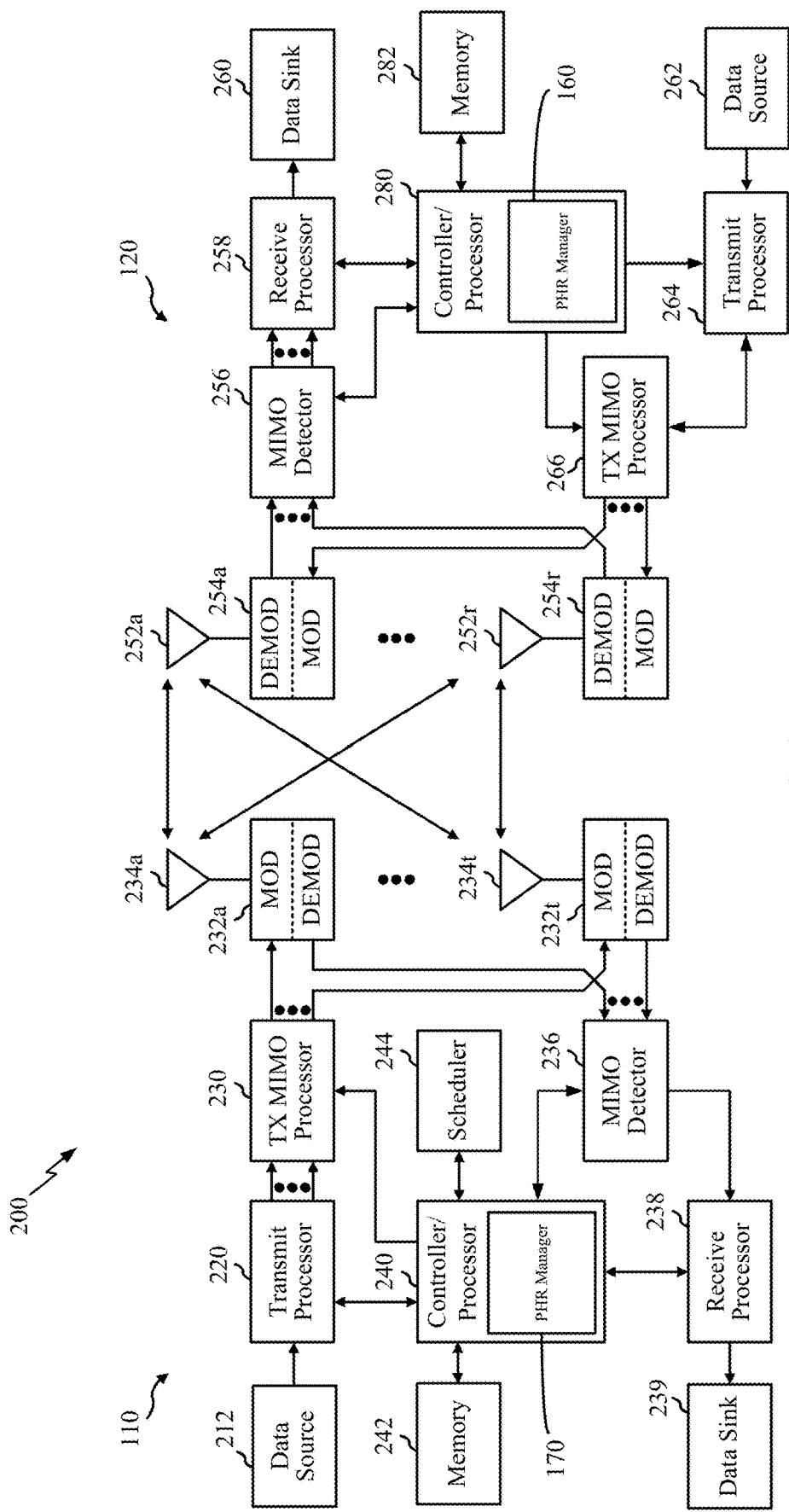
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a PHR manager 170 that may be configured to perform the various techniques and methods described herein (e.g., the operations 1200 of FIG. 12, the operations 1400 of FIG. 14, and/or the operations 1600 of FIG. 16). As also shown in FIG. 2, the controller/processor 280 of the UE 120 has a PHR manager 160 that may be configured to perform the various techniques and methods described herein (e.g., the operations 1100 of FIG. 1, the operations 1300 of FIG. 13, and/or the operations 1500 of FIG. 15).

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Overview of Half Duplex and Full Duplex Modes

Fifth generation (5G) wireless networks are expected to provide ultra-high data rates and support a wide scope of application scenarios. Wireless full-duplex (FD) communications is an emerging technique and is theoretically capable of doubling the link capacity when compared with half-duplex communications. The main idea of wireless full-duplex communications is to enable radio network nodes to transmit and receive simultaneously on the same frequency band in the same time slot. This contrasts with conventional half-duplex operation, where transmission and reception either differ in time or in frequency.

Figure 3A:
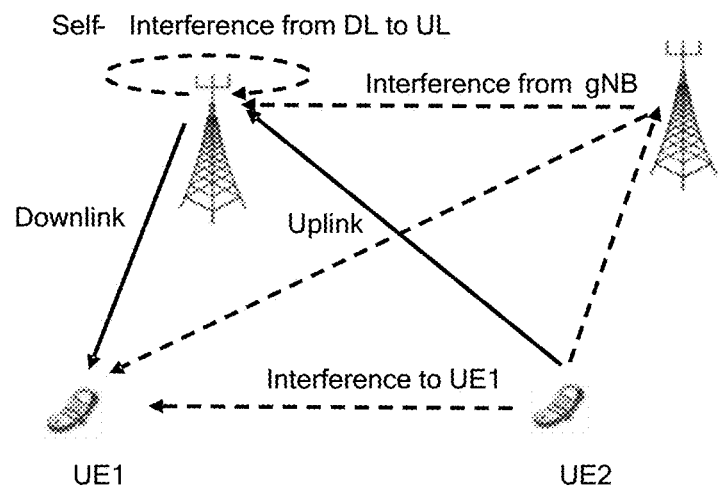
FIGS. 3A-3C illustrate different full duplex communication modes, in accordance with certain aspects of the present disclosure.

According to certain aspects, the wireless communication system may support various FD communication modes. FIG. 3A, for example, illustrates a FD communication mode with a FD BS and HD UE. In FIG. 3A, the FD BS can communicate simultaneously in UL and DL with two half-duplex terminals (i.e., UE1 and UE2) using the same radio resources. Here, the FD BS may be susceptible to self-interference from its downlink to uplink operation and interference from other gNBs. Similarly, UE1 may be susceptible to interference from the other gNB(s) and interference from UE2.

Figure 3B:
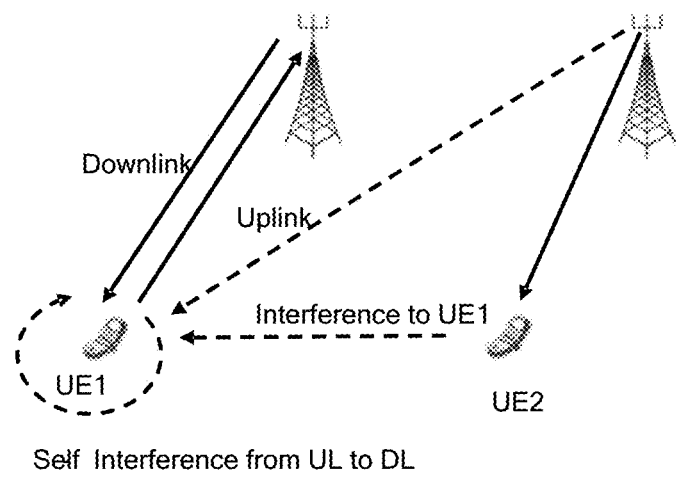

FIG. 3B illustrates another FD communication mode with a FD gNB and a FD UE (e.g., UE1). In FIG. 3B, the FD gNB and FD UE can communicate simultaneously in UL and DL with each other using the same radio resources. While communicating, the FD UE may be susceptible to self-interference, interference from other gNB(s), and interference from UE2.

Figure 3C:
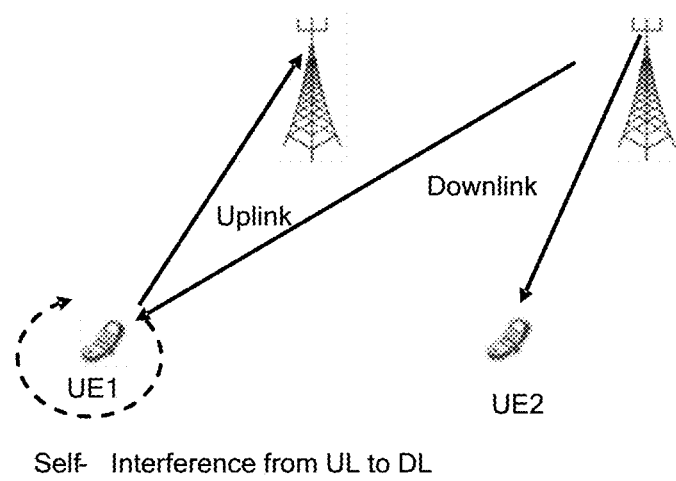

FIG. 3C illustrates yet another FD communication mode with a FD UE only (e.g., UE1). Here, the FD UE can communicate simultaneously in UL and DL with multiple transmission-reception points (e.g., multiple BSs) using the same radio resources. In this example, the FD UE may be susceptible to self-interference from UL to DL operation.

Figure 4A:
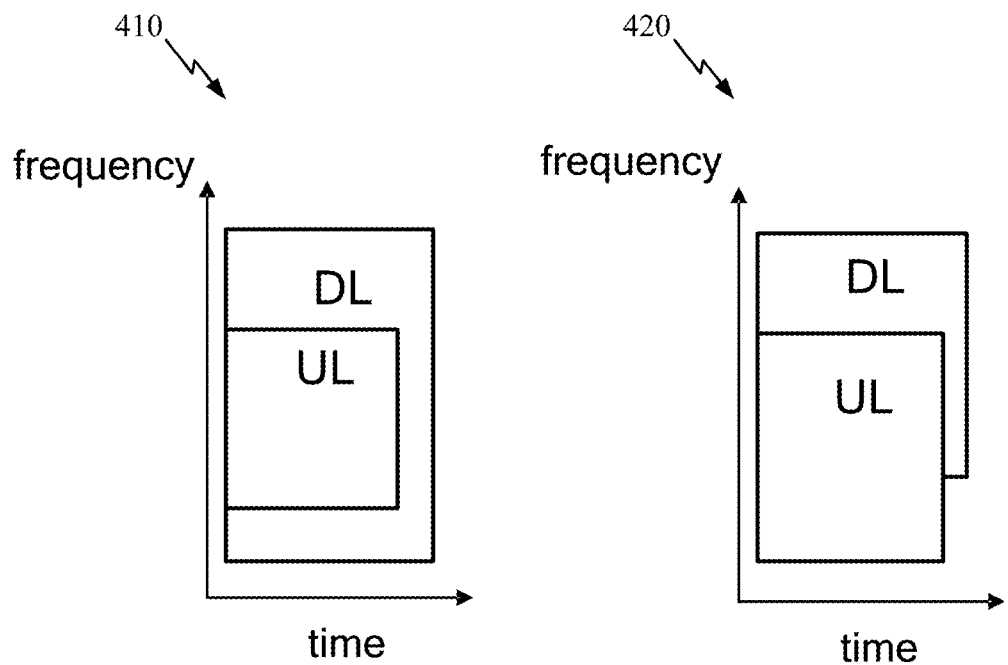
FIGS. 4A & 4B show examples of different types of full duplex operation, in accordance with certain aspects of the present disclosure.

In addition to supporting various FD communication modes (also referred to herein as deployments), the wireless communication system may support various types of FD operation. In-band full duplex (IBFD) depicted in FIG. 4A, for example, is one type of FD operation in which devices can transmit and receive at the same time and on the same frequency resources. As shown in 410 of FIG. 4A, in one aspect, the DL and UL may fully share the same IBFD time/frequency resource (e.g., there may be a full overlap of the DL and UL allocations within the IBFD time/frequency resource). As shown in 420 of FIG. 4A, in one aspect, the DL and UL may partially share the same IBFD time/frequency resource (e.g., there may be a partial overlap of the DL and UL allocations within the IBFD time/frequency resource).

Figure 4B:
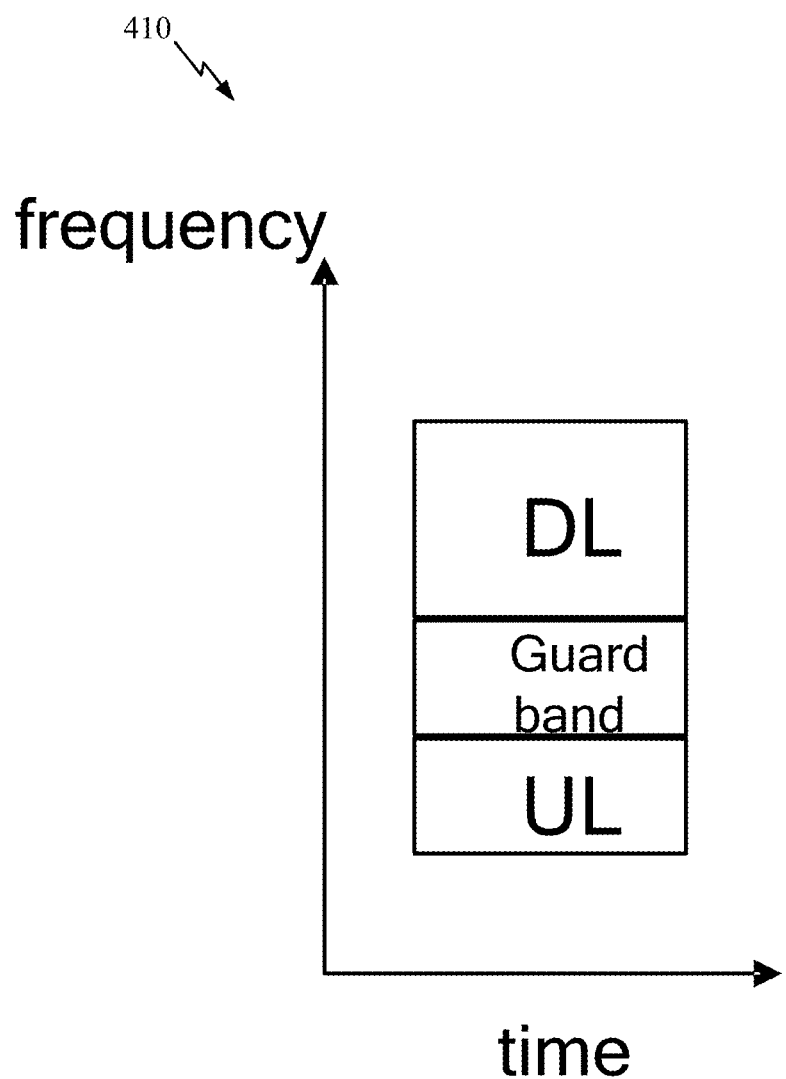

Sub-band FDD (also referred to as flexible duplex), which is shown in FIG. 4B, is another type of FD operation in which devices can transmit and receive at the same time but on different frequency resources. As shown in FIG. 4B, the DL resource may be separated from the UL resource in the frequency domain by a guard band. This mode of operations reduces the self-interference cancellation requirements on the FD device since the leakage is lower.

Figure 5:
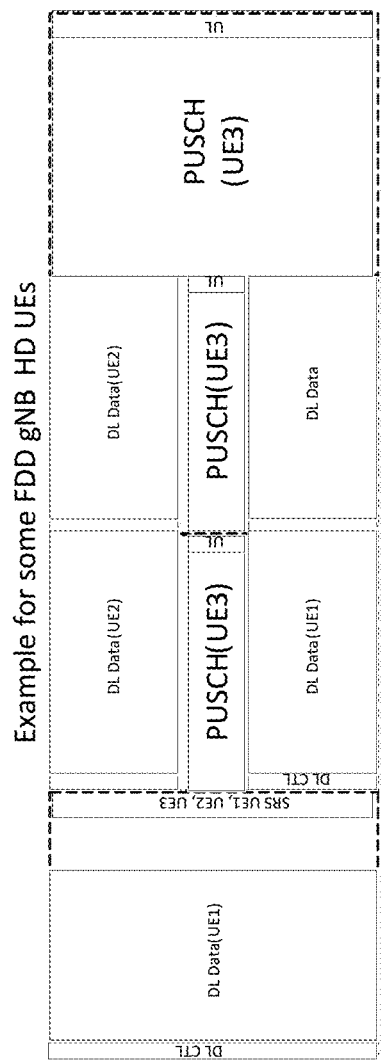
FIG. 5 illustrates an example spectrum for a full duplex base station and half duplex UE, in accordance with certain aspects of the present disclosure.
Figure 5:
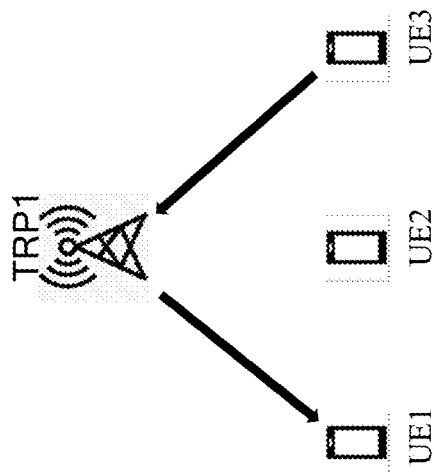
Figure 6:
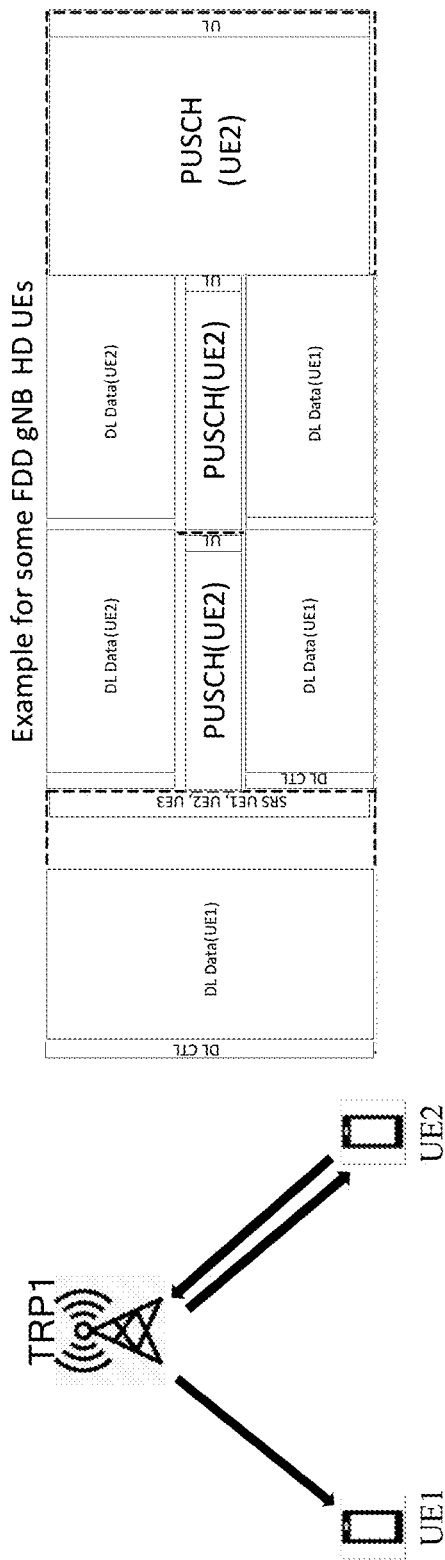
FIG. 6 illustrates an example spectrum for a full duplex base station and a full duplex UE, in accordance with certain aspects of the present disclosure.

In some aspects, there may be flexible DL/UL operation in time (across and within slots) and across UEs. FIG. 5 illustrates an example use of time/frequency resources (e.g., an example spectrum) for a FD gNB and HD UEs (e.g., UE1, UE2, and UE3). As shown, there may be simultaneous PDSCH and PUSCH grants for the same subframe/slot (for different UEs). FIG. 6 illustrates another example use of time/frequency resources for a FD gNB and FD UEs. As shown, compared to FIG. 5, there may be simultaneous PDSCH and PUSCH grants for the same subframe/slot for the same UE (e.g., UE2) and/or different UEs. For example, for a FD UE (e.g., UE2) there may be a simultaneous UL and DL grant.

In current communication systems, a switching delay is typically imposed when the UE adapts or changes the operating BWP. However, for a FD wireless system, the network may have to change the BW (and in addition the UL/DL allocations) from a slot to slot or even within the slot without incurring such a delay. In FIGS. 5 and 6, for example, the UE(s) may have to change the UL transmission (or DL reception) BWP between slots in zero latency. In FIGS. 5 and 6, there may be full reciprocity (e.g., based on the SRS sounding) to cover the entire DL BWP or partial reciprocity (e.g., based on the SRS sounding) to cover part of the DL BWP.

Figure 7:
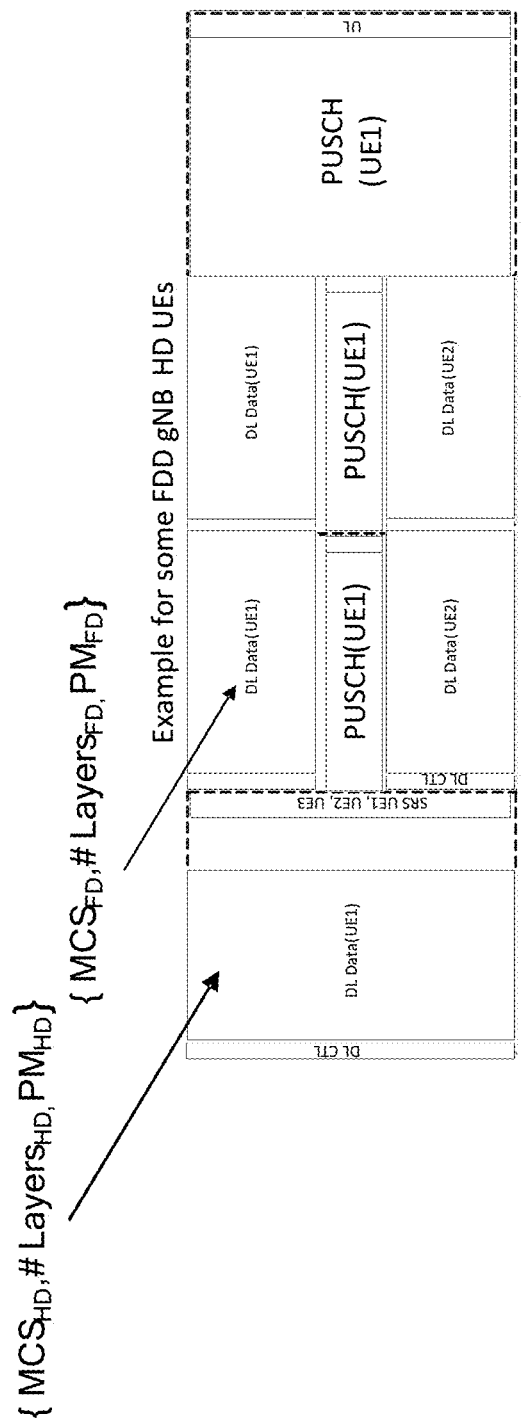
FIG. 7 illustrate an example CSI reporting scenario for a FD UE, in accordance with certain aspects of the present disclosure.

In general, a FD capable UE may report different CSI reports (e.g., CQI/PMI/RI) for both HD and FD mode. FIG. 7, for example, shows a scenario in which UE1 reports a first CSI report for HD mode and UE2 reports a second CSI report for FD mode. The reports may be different because of the coexistence of the UL interference (or it's residual). The network may differentiate between the DL scheduling at the FD and HD slots based on the CSI reports. This means that the DL scheduling for the HD slot (i.e. $MCS_{HD}$, #$Layer_{SHD}$, $PM_{HD}$) is different than that of the FD slot (i.e. $MCS_{FD}$, #$Layer_{SFD}$, $PM_{FD}$).

Figure 8:
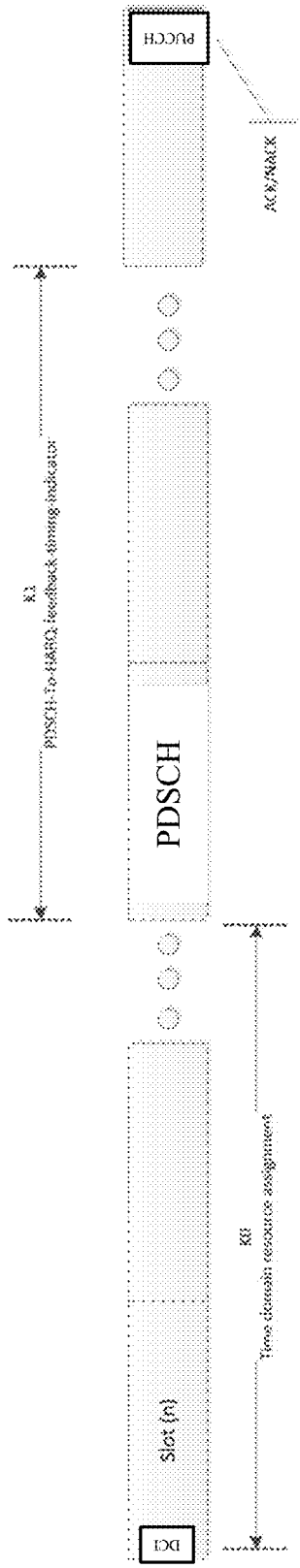
FIG. 8 illustrates an example of HARQ ACK/NACK timing, in accordance with certain aspects of the present disclosure.
Figure 9:
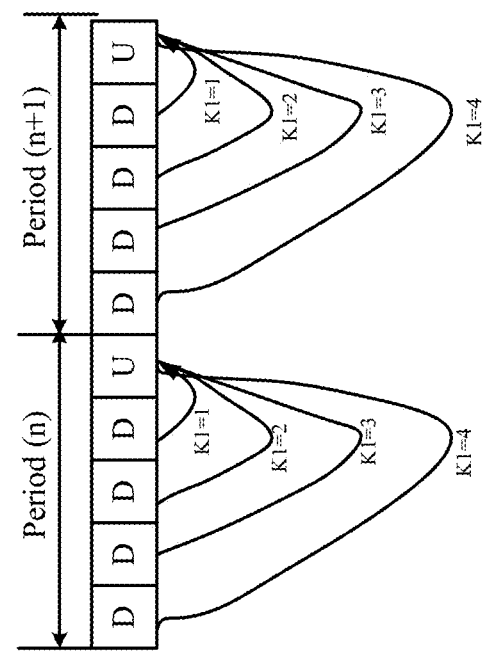
FIG. 9 illustrates an example of indicating a scheduling parameter for HARQ ACK/NACK timing, in accordance with certain aspects of the present disclosure.

Additionally, in current systems, HARQ ACK/NACK timing is generally fully configurable. The HARQ ACK/NACK timing is generally controlled with a feedback timing indicator (k1), e.g., as shown in FIG. 8. Feedback for multiple PDSCH in time can be transmitted in one UL data/control region. This can be achieved by configuring the HARQ ACK/NACK timing for each PDSCH by specifying the parameter k1 in the DL DCI (e.g., as shown in FIG. 9). Regarding the HARQ ACK codebook, HARQ-ACK feedback with one bit per TB may be supported. Likewise, a code block group (CBG)-based transmission with single/multi-bit HARQ-ACK feedback may be supported. In some cases, only a CBG-based (re)-transmission may be allowed for the same TB of a HARQ process. A CBG can include all code blocks of a TB regardless of the transport block size (TBS), meaning that a TB may include a single CBG. In this case, the UE can report a single HARQ ACK bit for the TB. In addition, a CBG can include a single code block and CBG granularity can be configurable by higher layers.

Figure 10:
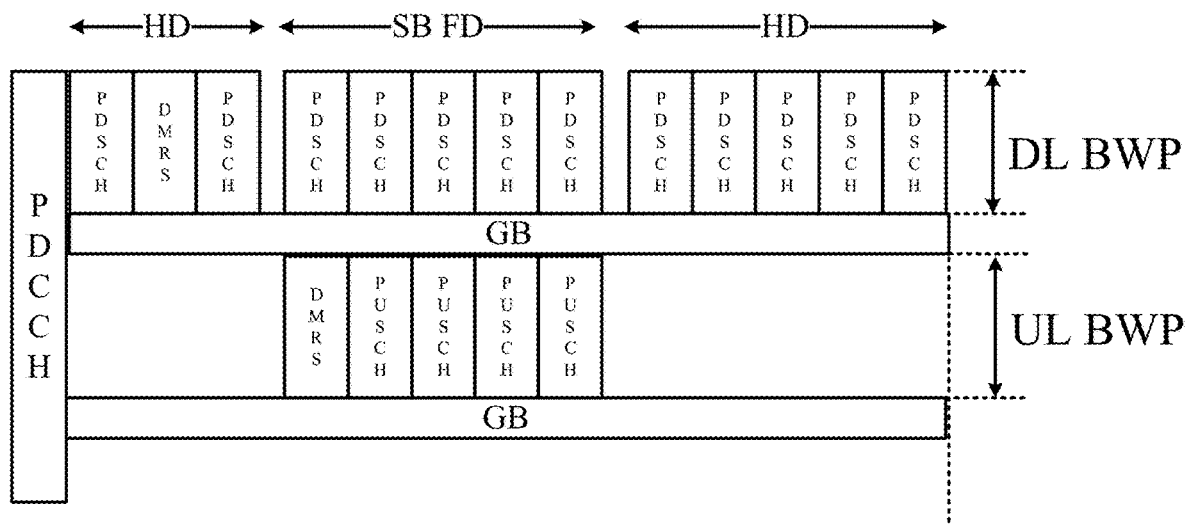
FIG. 10 illustrates a reference scenario of a FD UE operating in a SBFD slot, in accordance with certain aspects of the present disclosure.

In general, a FD UE may operate in a full duplex slot where it transmits UL and receives DL simultaneously. However, based on the actual UL and DL assignment, the simultaneous UL and DL operation may happen for a subset of the symbols within the slot and the UE may operate in HD mode for the remaining subset of symbols. In these cases, the quality of the DL reception in a given symbol may be impacted by the presence of an UL scheduling opportunity in the same symbol. FIG. 10, for example, shows a reference scenario of a FD UE operating in a SBFD slot, according to certain aspects of the present disclosure. Here, the quality of the DL reception may depend on whether an UL scheduling exists or not in each symbol. For example, FD symbols 4-8 may have a different quality than other HD symbols 1-3 and 9-13. Accordingly, it may be desirable to provide a TB configuration and HARQ ACK protocol to account for FD operation.

Example PHR for Half Duplex and/or Full Duplex Modes

Aspects of the present disclosure provide techniques for determining reporting power headroom reports (PHR) associated with full duplex (FD) and/or half-duplex (HD) operating modes.

FD (e.g., simultaneous uplink (UL) and downlink (DL) transmission) capability can be implemented at a gNB and/or a UE. For example, at a UE, UL transmissions can be sent from one panel and DL transmissions can be received at another (different) panel of the UE. In some cases, such FD operations may be performed in various frequency ranges (FRs) (e.g., FR1, FR2 or FR1 and FR2). Moreover, successful FD communication may be conditioned on beam separation or other factors associated with the UL and/or DL channels (e.g., involving separate antenna panels/arrays).

In general, FD communications provide latency reduction of communication. In other words, it is possible to receive one or more DL signals in UL only slots, which can enable latency savings. Furthermore, spectrum efficiency can be enhanced on a per-cell and/or a per-UE basis, as resources may be utilized in a more efficient manner.

In some cases, there may be two different PHRs calculated for the two operating modes: HD operating mode or FD operating mode. In the PHR report for the FD operating mode, the maximum UL transmit power may be limited by a self-interference constraint (e.g., a measured self-interference value and/or a self-interference threshold).

Certain aspects techniques for determining how and when to report PHR(s) associated with FD) and/or HD operating modes. For example, by receiving an indication from a gNB (e.g., a network entity) and/or using a rule defined in a standard specification, the UE may advantageously report PHR for different operating modes in a more efficient manner. Furthermore, techniques described herein also provide using self-interference thresholds to determine whether a UE should abort FD communication altogether (e.g., and switch temporarily to HD operation or switch to communicate via HD only).

Figure 11:
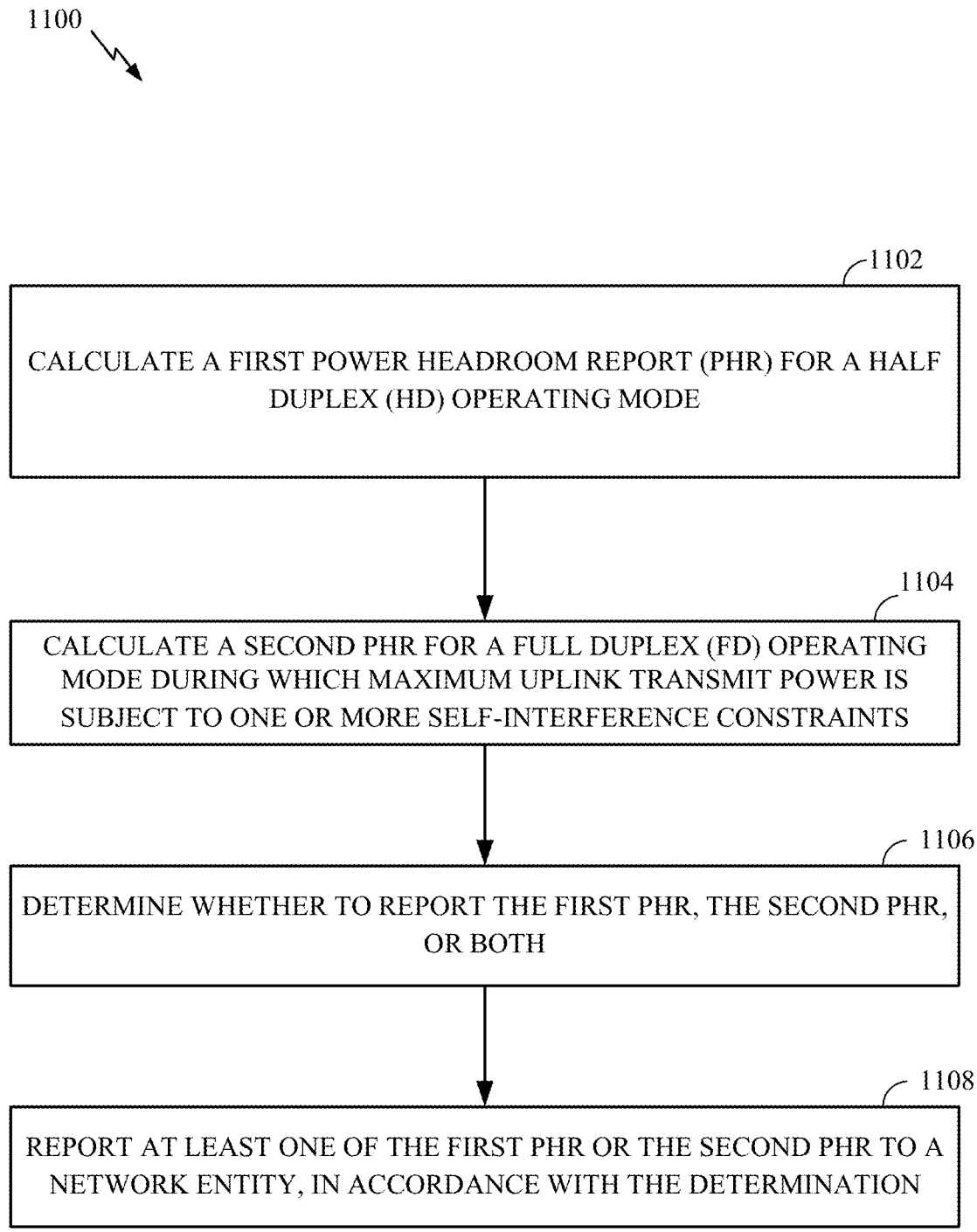
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120 in the wireless communication network 100, shown in FIG. 1). Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 begin, at block 1102, by calculating a first PHR for a HD operating mode.

At 1104, the UE calculates a second PHR for a FD operating mode during which maximum uplink transmit power is subject to one or more self-interference constraints.

At 1106, the UE determines whether to report the first PHR, the second PHR, or both.

At 1108, the UE reports at least one of the first PHR or the second PHR to a network entity, in accordance with the determination.

Figure 12:
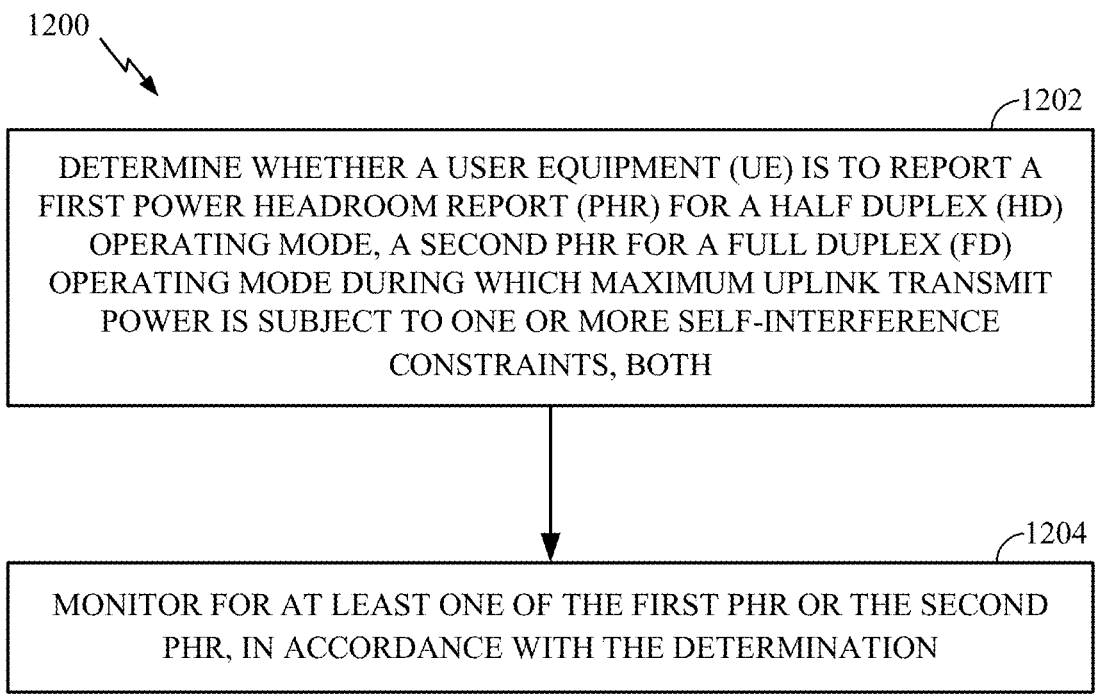
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a network entity or a BS (e.g., such as a BS 110 in the wireless communication network 100, shown in FIG. 1). Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 begin, at block 1202, by determining whether a UE is to report a first PHR for a HD operating mode, a second PHR for a FD operating mode during which maximum uplink transmit power is subject to one or more self-interference constraints, or both.

At 1204, the BS monitors for at least one of the first PHR or the second PHR, in accordance with the determination.

In some cases, PHRs may be calculated for both the HD mode and FD mode for communication. In a PHR report for the FD mode, the max UL transmit power may be limited by a self-interference value and/or a self-interference threshold. In some cases, the network entity (e.g., a gNB) may indicate PHR reporting for a single mode (e.g., FD or HD) or both modes. In another case, a standard may define PHR reporting for either a single mode (e.g., FD or HD) or both modes.

In certain aspects, the UE may report a PHR based on the resources allocated per operating mode. For example, the UE may report the HD PHR for one or more HD slots, and report the FD PHR for one or more FD slots. When reporting one PHR for one particular mode, the UE may indicate the mode for which the UE is reporting by including a mode flag.

Additionally or alternatively, the UE may simply report the PHR in accordance with the indication received from the network entity. In this case, the indication may be sent to the UE via radio resource control (RRC), media access control (MAC) control element (CE), or downlink control information (DCI). In some cases, the UE may report the HD PHR as a default value, and report an offset/differential value for FD PHR when needed (e.g., when one or more conditions is/are met).

In some cases, a UE may be able to indicate a request to abort FD mode (e.g., and request a change to HD or HD-only mode operation).

Figure 13:
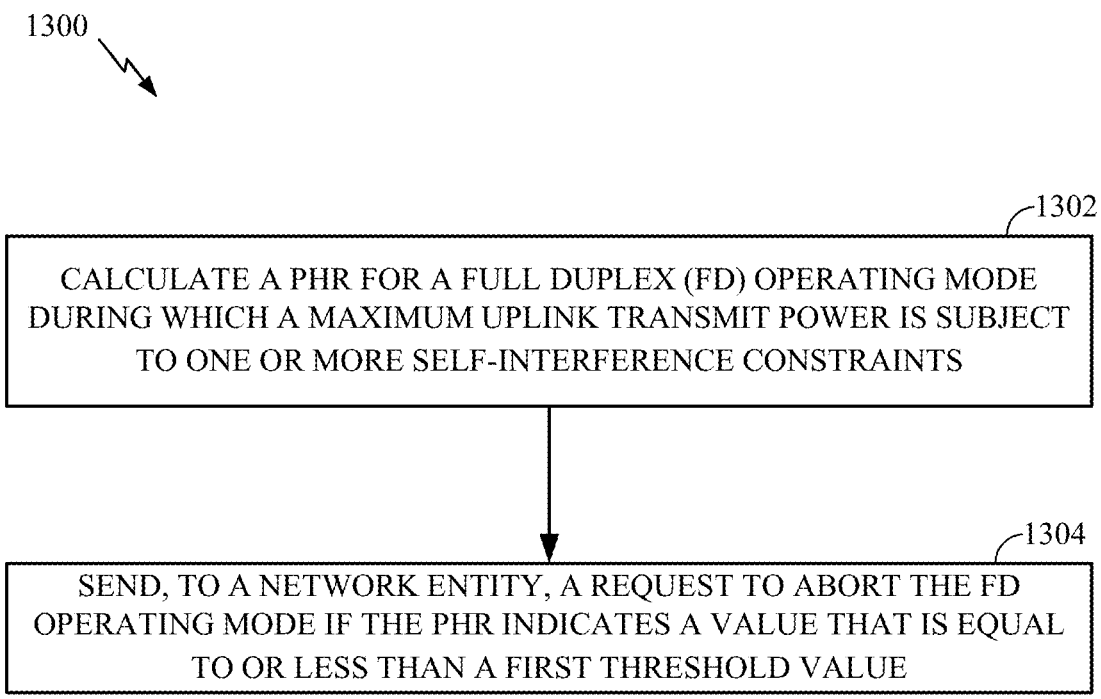
FIG. 13 is a flow diagram illustrating example operations for wireless communication by a UE, in accordance with certain aspects of the present disclosure.

FIG. 13 is a flow diagram illustrating example operations 1300 for wireless communication, in accordance with certain aspects of the present disclosure. The operations 1300 may be performed, for example, by UE (e.g., such as a UE 120 in the wireless communication network 100, shown in FIG. 1). Operations 1300 may be implemented as software components that are executed and run on one or more processors (e.g., controller/processor 280 of FIG. 2). Further, the transmission and reception of signals by the UE in operations 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1300 begin, at block 1302, by the UE calculating a PHR for a FD operating mode during which a maximum uplink transmit power is subject to one or more self-interference constraints.

At 1304, the UE sends, to a network entity, a request to abort the FD operating mode if the PHR indicates a value that is equal to or less than a first threshold value.

Figure 14:
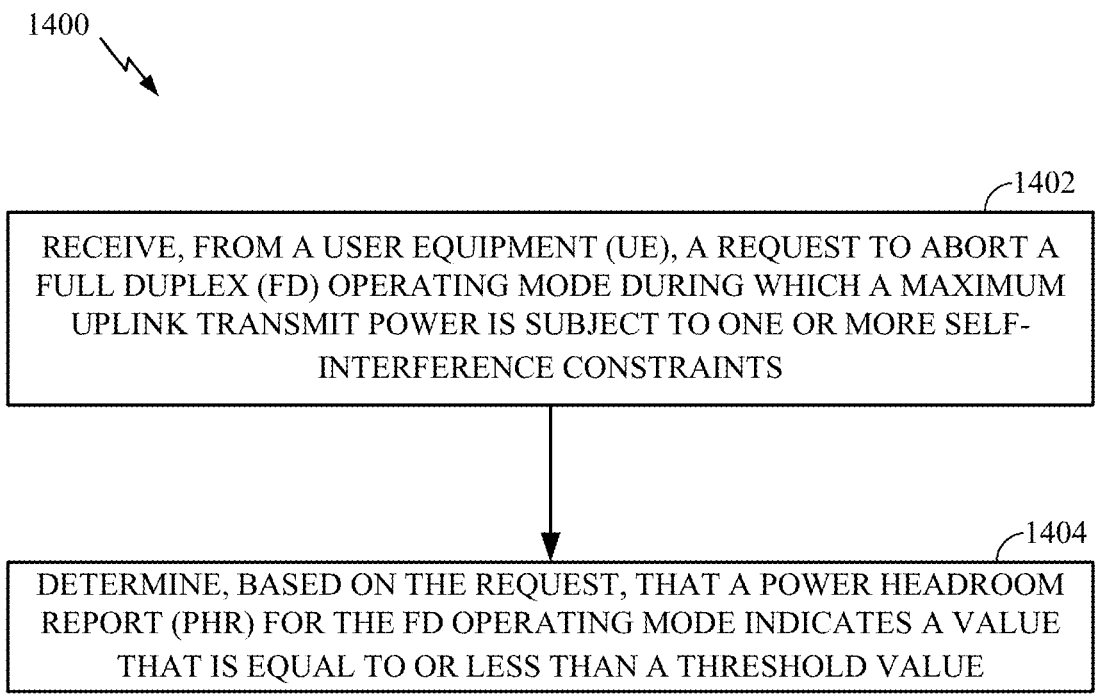
FIG. 14 is a flow diagram illustrating example operations for wireless communication by a BS, in accordance with certain aspects of the present disclosure.

FIG. 14 is a flow diagram illustrating example operations 1400 for wireless communication, in accordance with certain aspects of the present disclosure. The operations 1400 may be performed, for example, by a network entity or a BS (e.g., such as a BS 110 in the wireless communication network 100, shown in FIG. 1). Operations 1400 may be implemented as software components that are executed and run on one or more processors (e.g., controller/processor 240 of FIG. 2). Further, the transmission and reception of signals by the BS in operations 1400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1400 begin, at block 1402, by the network entity receiving, from a UE, a request to abort a FD operating mode during which a maximum uplink transmit power is subject to one or more self-interference constraints.

At 1404, the network entity determines, based on the request, that a power headroom report (PHR) for the FD operating mode indicates a value that is equal to or less than a threshold value.

In certain aspects, if PHR is calculated to be less than a threshold, this may trigger the UE to report a FD abortion. This may make sense because the small FD PHR may indicate a significant impact due to self-interference. In such cases, the UE may report the FD abortion by transferring to HD mode (e.g., by requesting to exit FD mode and enter HD mode).

In some cases, the threshold can be defined in the specification of the UE or signaled to the UE by gNB (e.g., via RRC, MAC-CE, or DCI). The threshold may be defined (e.g., in a standard) and/or signaled, as described above, and the threshold may be associated with the self-interference RSRP threshold. For example, if the PHR is less than a threshold, but the self-interference RSRP is relatively small, then the small PHR may have been caused by reasons other than the self-interference constraint. In this case, the UE may not be triggered to send any request to abort FD mode.

Example Reporting Full Duplex Power Control Condition

Aspects of the present disclosure also provide techniques for reporting FD power control condition such as indicating uplink (UL) power control condition(s) related to self-interference constraints.

Currently (e.g., in Rel-18), full duplex (FD) (e.g., simultaneous UL and/or downlink (DL) transmission capability can be implemented at a gNB and/or a UE. For example, at a UE, UL transmissions can be sent from one panel and DL transmissions can be received at another (different) panel of the UE. In some cases, such FD operations may be performed in various frequency ranges (FRs) (e.g., FR2). Moreover, successful FD communication may be conditioned on beam separation or other factors associated with the UL and/or DL channels (e.g., involving separate antenna panels/arrays).

In general, FD communications provides latency reduction of communication. In other words, it is possible to receive one or more DL signals in UL only slots, which can enable latency savings. Furthermore, spectrum efficiency can be enhanced on a per-cell and/or a per-UE basis, as resources may be utilized in a more efficient manner.

For FD communication modes, conventional uplink power control may be redefined to include a self-interference constraint. For example, while a UE is configured to support a maximum uplink transmit power, the actual maximum UL transmit power for FD mode may be limited by a self-interference threshold and/or a measured self-interference path loss reference signal received power.

Certain aspects provide techniques for leveraging of the proposals described above to advantageously and efficiently indicate (e.g., report) FD uplink power control condition of uplink quality degradation. For example, by comparing various power calculations described herein to thresholds, a UE may efficiently indicate FD uplink power control condition of uplink quality degradation on determined resources.

Figure 15:
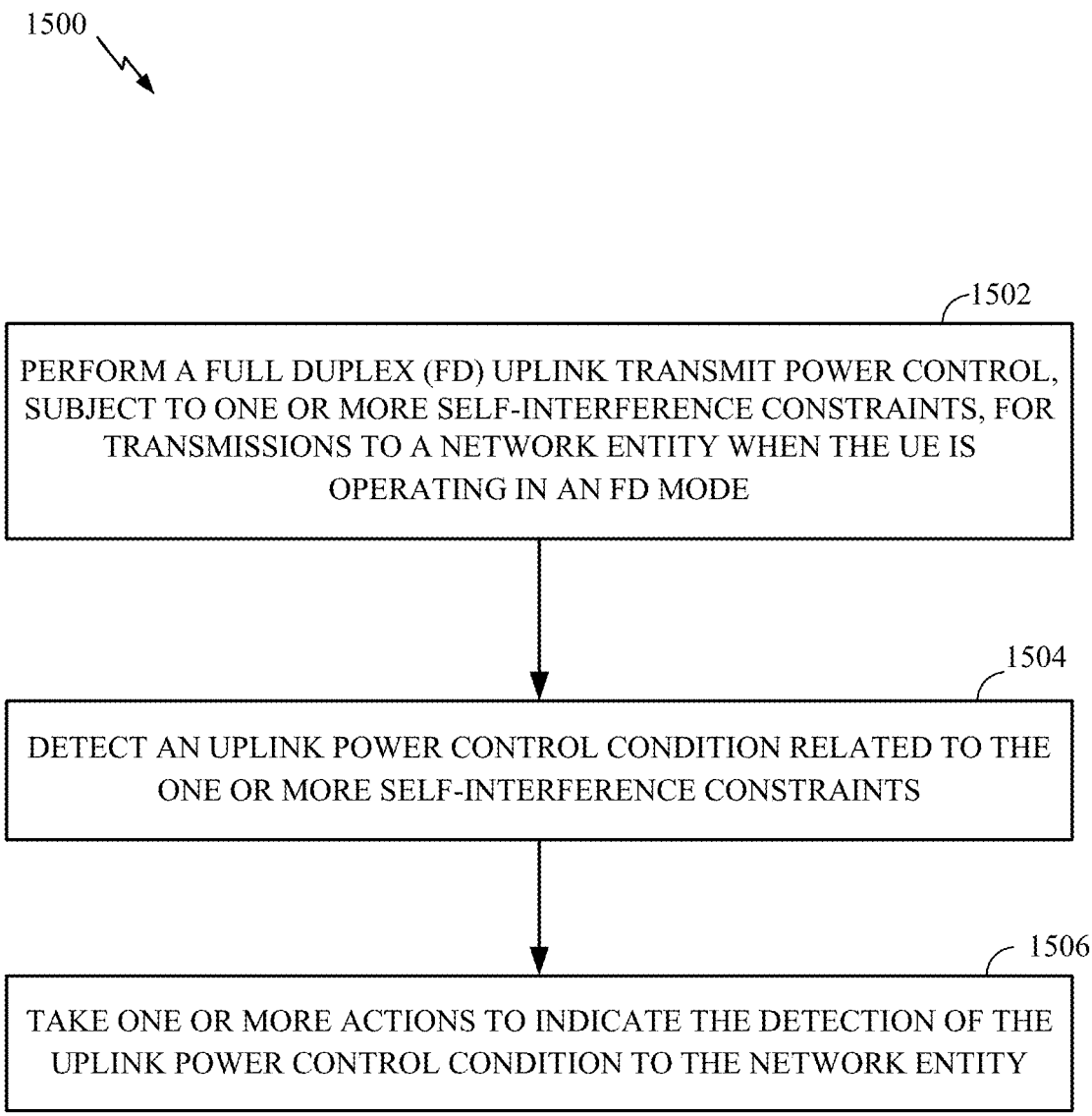
FIG. 15 is a flow diagram illustrating example operations for wireless communication by a UE, in accordance with certain aspects of the present disclosure.

FIG. 15 is a flow diagram illustrating example operations 1500 for wireless communication, in accordance with certain aspects of the present disclosure. The operations 1500 may be performed, for example, by UE (e.g., such as a UE 120 in the wireless communication network 100, shown in FIG. 1). Operations 1500 may be implemented as software components that are executed and run on one or more processors (e.g., controller/processor 280 of FIG. 2). Further, the transmission and reception of signals by the UE in operations 1500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1500 begin, at 1502, by the UE performing a FD uplink transmit power control, subject to one or more self-interference constraints, for transmissions to a network entity when the UE is operating in an FD mode.

At 1504, the UE detects an uplink power control condition related to the one or more self-interference constraints. In some cases, the uplink power control condition may indicate an FD uplink quality degradation.

At 1506, the UE takes one or more actions to indicate the detection of the uplink power control condition to the network entity.

Figure 16:
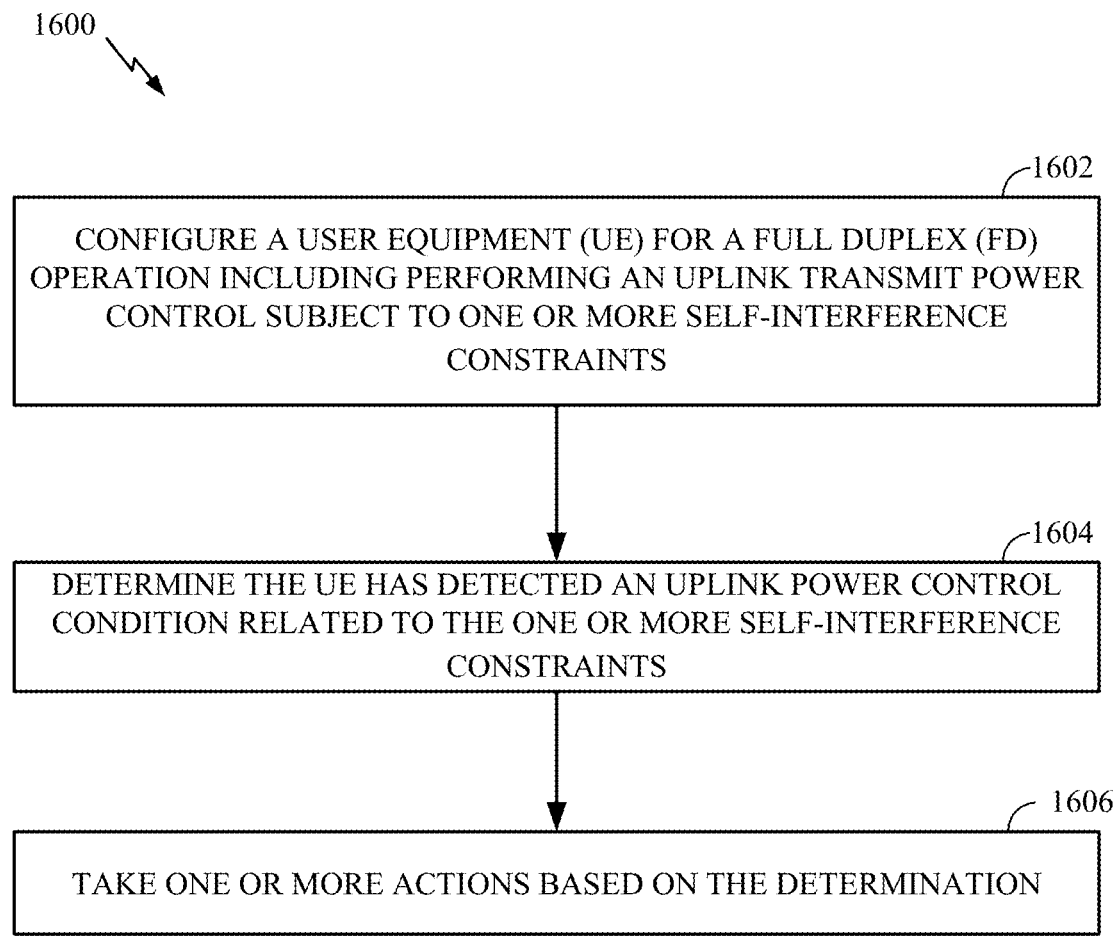
FIG. 16 is a flow diagram illustrating example operations for wireless communication by a BS, in accordance with certain aspects of the present disclosure.

FIG. 16 is a flow diagram illustrating example operations 1600 for wireless communication that may be considered complementary to operations 1500 of FIG. 15. For example, operations 1600 may be performed by a network entity (e.g., such as a BS 110 in the wireless communication network 100, shown in FIG. 1) to receive and process an indication of an uplink power control condition detected by a UE performing operations 1500 of FIG. 15. Operations 1600 may be implemented as software components that are executed and run on one or more processors (e.g., controller/processor 240 of FIG. 2). Further, the transmission and reception of signals by the BS in operations 1600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1600 begin, at 1602, by the network entity configuring a UE for a FD operation including performing an uplink transmit power control subject to one or more self-interference constraints.

At 1604, the network entity determines the UE has detected an uplink power control condition related to the one or more self-interference constraints.

At 1606, the network entity takes one or more actions based on the determination. For example, if the uplink power control condition indicates an FD uplink quality degradation, the network entity may participate in a beam pair switching procedure with the UE.

The UE may consider various conditions indicative of an uplink power condition that should be reported to the gNB.

As an example, the UE may report an uplink power control condition if it detects that (the absolute value of) a difference between an original maximum UL transmit power (e.g., the max supported by the UE) and an actual maximum UL transmit power with SI constraint(s) is greater than or equal to a first threshold.

As another example, the UE may report an uplink power control condition if it detects that measured UL self-interference reference signal received power (RSRP) or UL path loss (PL), which may be limited by the self-interference constrained power control, is less than or equal to a second threshold.

In some cases, the first and/or second threshold(s) be defined (e.g., in a standard specification) or signaled to the UE by gNB (e.g., via radio resource control (RRC), media access control (MAC) control element (CE), or downlink control information (DCI).

In certain aspects, a configuration of maximum permissible exposure (MPE) may also cause any of the above conditions to be satisfied and an uplink power condition to be reported. Because there may be different causes of an uplink power condition, the UE may include different codes/ values to indicating the reason that the uplink power condition failure is being reported (e.g., 1 for self-interference caused; 2 for MPE caused).

In some cases an uplink power condition report may be triggered jointly for different (multiple) conditions are met (e.g. when UL power degradation or difference>=k dBm). In some cases, the report may also include the power degradation amount associated with the different reasons (e.g., if maximum power reduction (MPR) has degraded by X dBm and/ the self-interference may be degraded by Y dBm).

UL resources used for reporting FD UL power control condition may be determined in a variety of ways. In one example, the UL resources may be the configured UL resources in a half-duplex (HD) mode. In this case, the UE may use full power to report the FD UL power control condition and/or the UL power control condition in slots allocated for HD operation.

In some case, the UL resources used for reporting may include event triggered/P/AP UCI on a physical uplink control channel (PUCCH), a physical uplink shared channel (PUSCH), an UL grant on MAC-CE (e.g., the UL grant is triggered by a special SR for this UL power control condition report and this report may be an enhanced PHR report), a contention free random access (CFRA) message (e.g., msg1), and/or a contention based random access (CBRA) message (e.g., msg3 via MAC-CE with a corresponding reason code for FD UL power control condition).

In another example, the UL resources for reporting may be the configured resources in the FD mode. In this case, standard specifications may define a rule or the gNB may provide signaling indicating that the UE may ignore the self-interference constrained power control parameter or boost the UL transmit power (e.g., by X dBm) or simply use full power for this reporting purpose. While self-interference may, in some cases, cause DL failure, boosting power may help achieve successful UL reporting. In some case, the UL resources used for reporting may include event triggered/P/ AP UCI on a physical uplink control channel (PUCCH), a physical uplink shared channel (PUSCH), an UL grant on MAC-CE (e.g., the UL grant is triggered by a special SR for this UL power control condition report and this report may be an enhanced PHR report), a contention free random access (CFRA) message (e.g., msg1), and/or a contention based random access (CBRA) message (e.g., msg3 via MAC-CE with a corresponding reason code for FD UL power control condition). In such cases, an UL grant may include a transmit power configuration for reporting. If so, the UE transmits the report according to the transmit power configuration that involves a transmit power control not subject to the one or more self-interference constraints, a boosted uplink transmit power or both.

In another example, the UL resources for reporting may be reserved/booked by the gNB in FD mode (e.g., periodic UL resources for PHR reporting). In this case, the UE may (or may not) ignore the self-interference constrained power control parameter and may (or may not) boost the UL transmit power for this reporting purpose. In such cases, if the gNB does not receive the reporting(s) in the reserved resources, this may indicate a FD UL power control condition of UL quality degradation or other cause.

In some cases, UL resources may be reserved for a UE in FD mode and, rather than send a report, the UE may instead not send an uplink power condition (FD beam failure) reporting to the gNB at all. In such cases, by not receiving the report(s) from the UE on the reserved/booked resources, the gNB may interpret the lack of a report from the UE as an indication of an uplink power condition (UL quality degradation or other cause).

Figure 17:
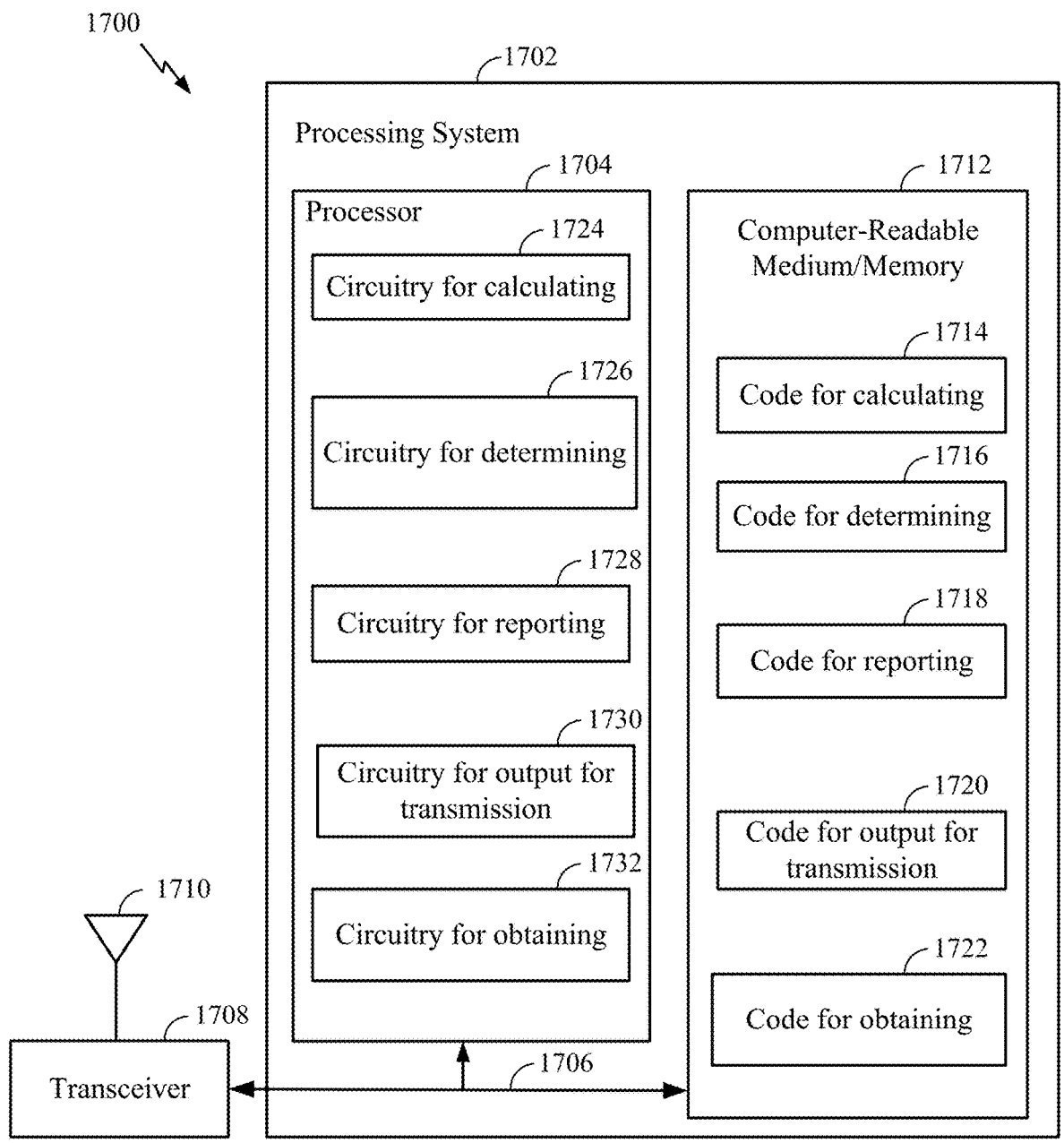
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 11 and/or FIG. 13. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 11 and/or FIG. 13, or other operations for performing the various techniques discussed herein. In certain aspects, computer-readable medium/memory 1712 stores code 1714 for calculating; code 1716 for determining; code 1718 for reporting; code 1720 for outputting for transmission; and code 1722 for obtaining. In certain aspects, the processor 1304 has circuitry configured to implement the code stored in the computer-readable medium/memory 1712. The processor 1704 includes circuitry 1724 for calculating; circuitry 1726 for determining; circuitry 1728 for reporting; circuitry 1730 for outputting for transmission; and circuitry 1732 for obtaining.

Figure 18:
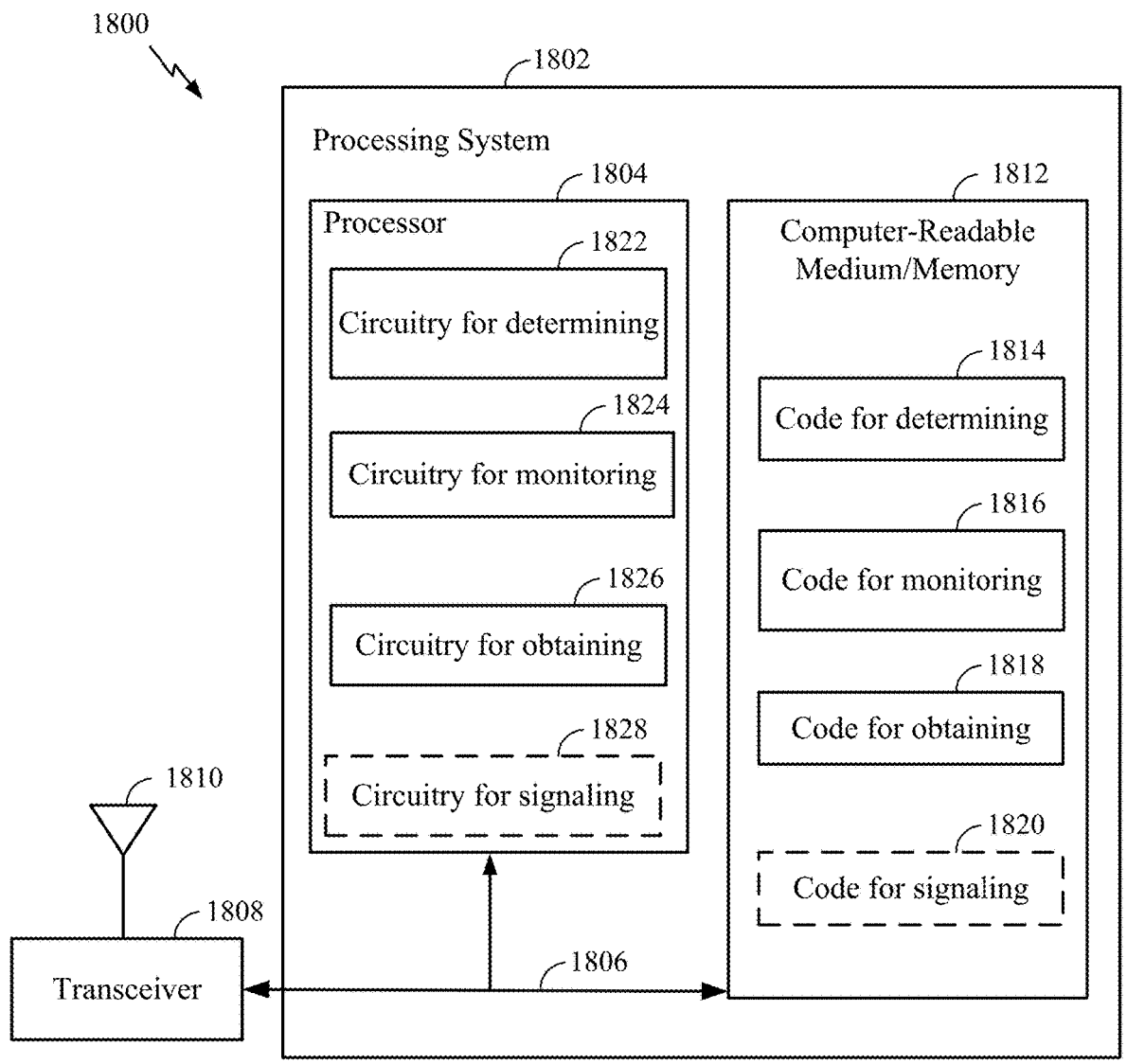
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 12 and/or FIG. 14. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 12 and/or FIG. 14, or other operations for performing the various techniques discussed herein. In certain aspects, computer-readable medium/memory 1812 stores code 1814 for determining; code 1816 for monitoring; code 1818 for obtaining; and code 1820 for signaling. In certain aspects, the processor 1804 has circuitry configured to implement the code stored in the computer-readable medium/memory 1812. The processor 1804 includes circuitry 1822 for determining; circuitry 1824 for monitoring; circuitry 1826 for obtaining; and circuitry 1828 for signaling.

Figure 19:
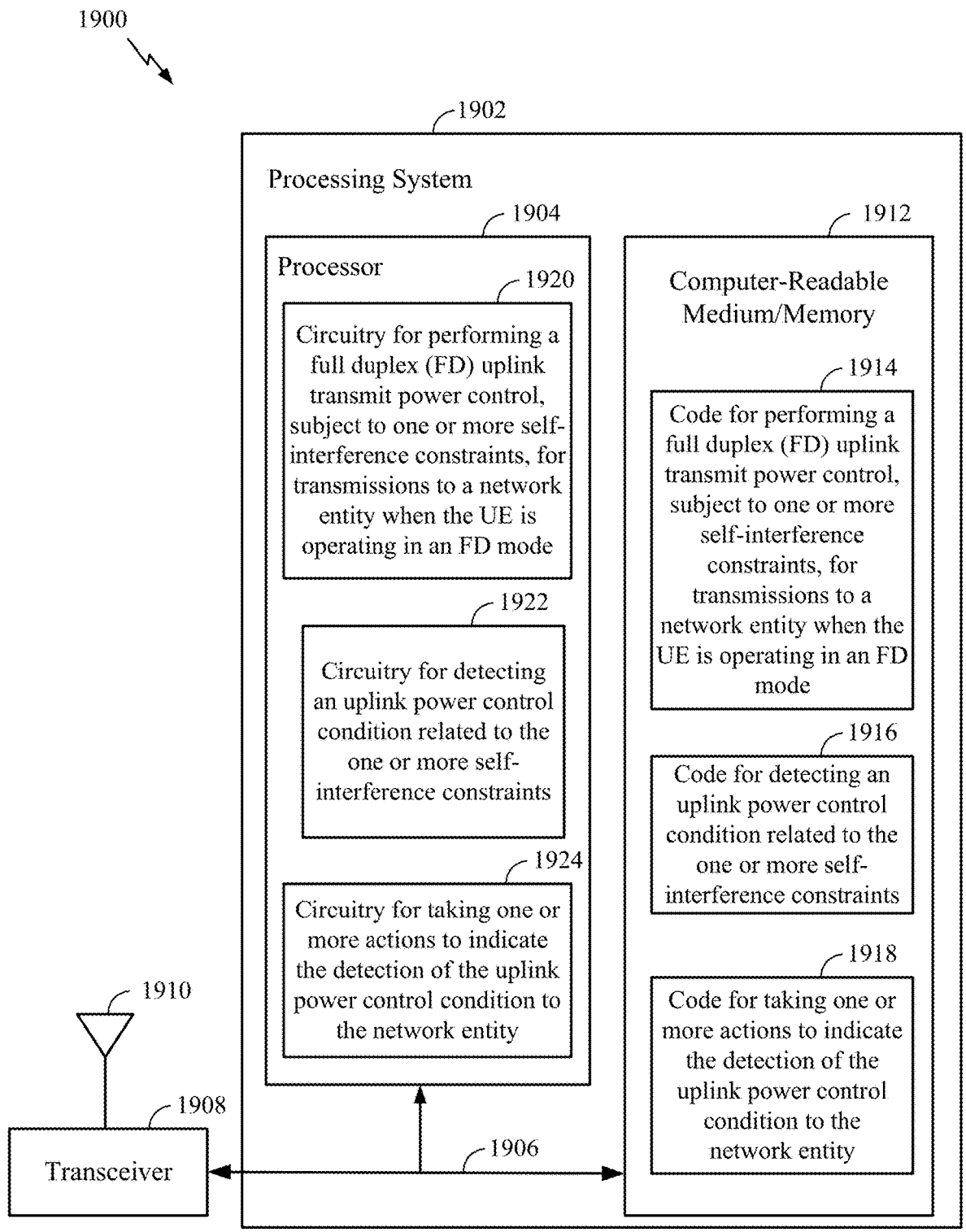
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 15. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 15, or other operations for performing the various techniques discussed herein. In certain aspects, computer-readable medium/memory 1912 stores code 1914 for performing a FD uplink transmit power control, subject to one or more self-interference constraints, for transmissions to a network entity when the UE is operating in an FD mode; code 1916 for detecting an uplink power control condition related to the one or more self-interference constraints; and code 1918 for taking one or more actions to indicate the detection of the uplink power control condition to the network entity. In certain aspects, the processor 1904 has circuitry configured to implement the code stored in the computer-readable medium/memory 1912. The processor 1904 includes circuitry 1920 for performing a FD uplink transmit power control, subject to one or more self-interference constraints, for transmissions to a network entity when the UE is operating in an FD mode; circuitry 1922 for detecting an uplink power control condition related to the one or more self-interference constraints; and circuitry 1924 for taking one or more actions to indicate the detection of the uplink power control condition to the network entity.

Figure 20:
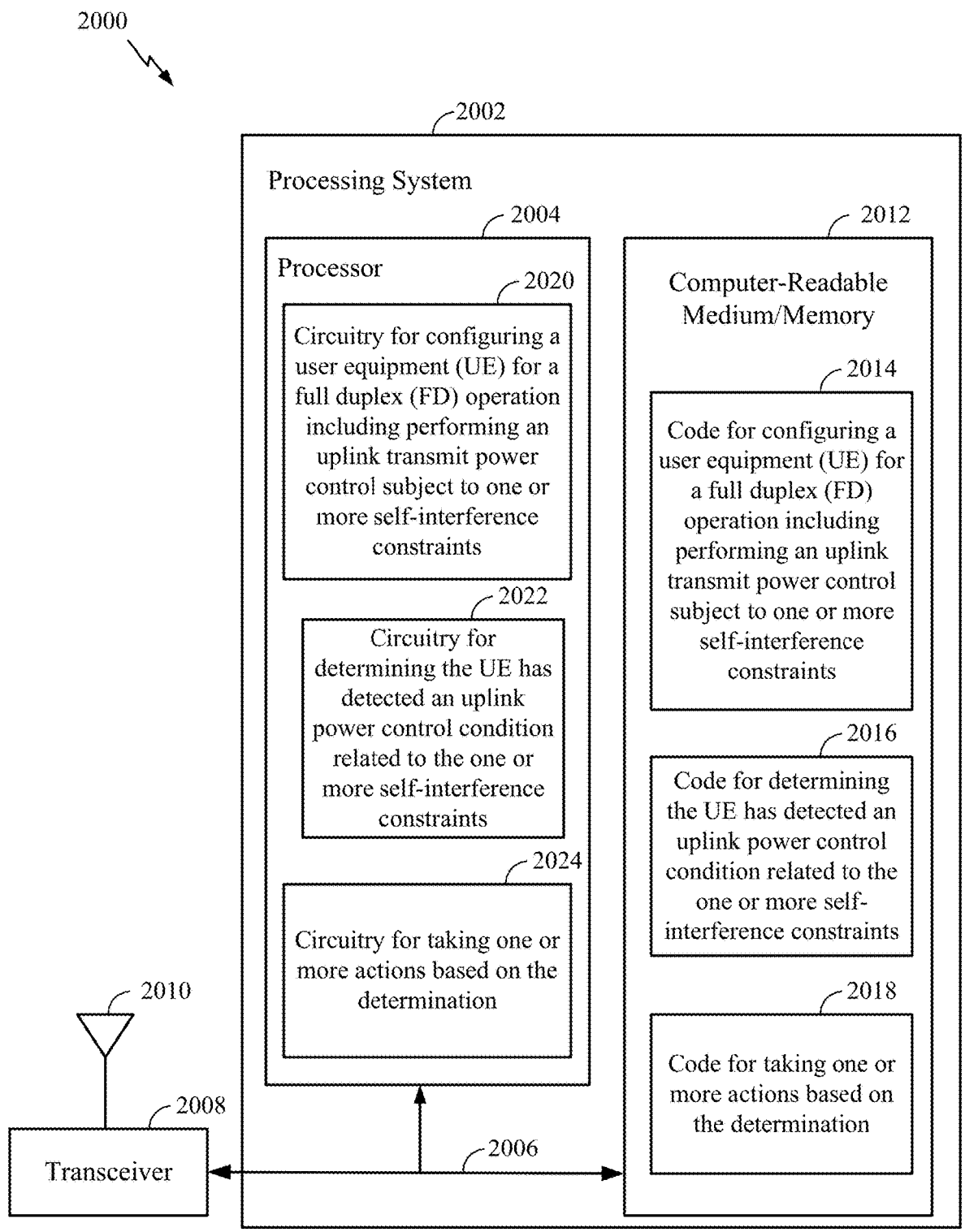
FIG. 20 illustrates a communications device that may include various components configured to perform operations for the techniques disclosed herein in accordance with aspects of the present disclosure.

FIG. 20 illustrates a communications device 2000 that may include various components (e.g., corresponding to means-plus-function components) configured to perform operations for the techniques disclosed herein, such as the operations illustrated in FIG. 16. The communications device 2000 includes a processing system 2002 coupled to a transceiver 2008. The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the operations illustrated in FIG. 16, or other operations for performing the various techniques discussed herein. In certain aspects, computer-readable medium/memory 2012 stores code 2014 for configuring a UE for a FD operation including performing an uplink transmit power control subject to one or more self-interference constraints; code 2016 for determining the UE has detected an uplink power control condition related to the one or more self-interference constraints; and code 2018 for taking one or more actions based on the determination. In certain aspects, the processor 2004 has circuitry configured to implement the code stored in the computer-readable medium/memory 2012. The processor 2004 includes circuitry 2020 for configuring a UE for a FD operation including performing an uplink transmit power control subject to one or more self-interference constraints; circuitry 2022 for determining the UE has detected an uplink power control condition related to the one or more self-interference constraints; and circuitry 2024 for taking one or more actions based on the determination.

Example Clauses

Implementation examples are described in the following numbered clauses:

Clause 1. A method for wireless communications by a user equipment (UE), comprising: calculating a first power headroom report (PHR) for a half duplex (HD) operating mode; calculating a second PHR for a full duplex (FD) operating mode during which maximum uplink transmit power is subject to one or more self-interference constraints; determining whether to report the first PHR, the second PHR, or both; and reporting at least one of the first PHR or the second PHR to a network entity, in accordance with the determination.

Clause 2. The method of Clause 1, wherein the determination is based on an indication from the network entity.

Clause 3. The method of Clause 2, wherein the indication is provided via at least one of a radio resource control (RRC) message, a medium access control (MAC) control element (MAC-CE), or a downlink control information (DCI) signaling.

Clause 4. The method of any one of Clauses 1-3, wherein the determination is based on one or more PHR reporting rules defined in a standard specification.

Clause 5. The method of any one of Clauses 1-4, wherein the determination is based on resources allocated per HD mode and FD mode.

Clause 6. The method of Clause 5, wherein the determination is to, at least one of: report the first PHR in slots of the resources allocated for the HD operating mode; or report the second PHR in slots of the resources allocated for the FD operating mode.

Clause 7. The method of any one of Clauses 1-6, wherein: the determination is to report either the first PHR or the second PHR; and the method further comprising including, in the report, a mode flag indicating the operating mode for the reported PHR.

Clause 8. The method of any one of Clauses 1-7, wherein: the determination is to report both the first PHR and the second PHR regardless of whether a current operating mode is FD or HD.

Clause 9. The method of any one of Clauses 1-8, wherein the determination is to: report the first PHR as a default report; and report the second PHR only when at least one conditions is met.

Clause 10. The method of Clause 9, wherein the second PHR is reported as a value of a difference between the first PHR and the second PHR.

Clause 11. The method of Clause 10, further comprising: receiving a threshold value via at least one of a radio resource control (RRC) message, a medium access control (MAC) control element (MAC-CE), or a downlink control information (DCI) signaling, wherein: the condition is that the value is equal to or above the threshold value.

Clause 12. The method of Clause 10, wherein the condition is that in a current slot, resources are allocated for the FD operating mode.

Clause 13. The method of any one of Clauses 1-12, further comprising, if the second PHR indicates a value that is equal to or less than a threshold value, sending, to a network entity, a request to abort the FD operating mode.

Clause 14. A method for wireless communications by a network entity, comprising: determining whether a user equipment (UE) is to report a first power headroom report (PHR) for a half duplex (HD) operating mode, a second PHR for a full duplex (FD) operating mode during which maximum uplink transmit power is subject to one or more self-interference constraints, both; and monitoring for at least one of the first PHR or the second PHR, in accordance with the determination.

Clause 15. The method of Clause 14, further comprising providing the UE an indication for determining whether to report the first PHR report, the second PHR report, or both.

Clause 16. The method of Clause 15, wherein the indication is provided via at least one of a radio resource control (RRC) message, a medium access control (MAC) control element (MAC-CE), or a downlink control information (DCI) signaling.

Clause 17. The method of any one of Clauses 14-16, wherein the determination is based on one or more PHR reporting rules defined in a standard specification.

Clause 18. The method of any one of Clauses 14-17, wherein the determination is based on resources allocated per HD mode and FD mode.

Clause 19. The method of Clause 18, wherein the determination is to, at least one of: monitor for the first PHR in slots of the resources allocated for the HD operating mode; or monitor for the second PHR in slots of the resources allocated for the FD operating mode.

Clause 20. The method of any one of Clauses 14-19, wherein: the determination is that the UE is to report either the first PHR or the second PHR, with a mode flag indicating the operating mode for the reported PHR.

Clause 21. The method of any one of Clauses 14-20, wherein: the determination is that the UE is to report both the first PHR and the second PHR regardless of whether a current operating mode is FD or HD.

Clause 22. The method of any one of Clauses 14-21, wherein the determination is that the UE is to: report the first PHR as a default report; and report the second PHR only when at least one conditions is met.

Clause 23. The method of Clause 22, wherein the second PHR is reported as a value of a difference between the first PHR and the second PHR.

Clause 24. The method of Clause 23, further comprising: signaling the UE a threshold value via at least one of a radio resource control (RRC) message, a medium access control (MAC) control element (MAC-CE), or a downlink control information (DCI) signaling, wherein the condition is that the value is equal to or above the threshold value.

Clause 25. The method of Clause 24, wherein the condition is that in a current slot, resources are allocated for the FD operating mode.

Clause 26. The method of any one of Clauses 14-25, further comprising receiving, from the UE, a request to abort the FD operating mode indicating the second PHR indicates a value that is equal to or less than a threshold value.

Clause 27. An apparatus for wireless communications by a user equipment (UE), comprising: at least one processor and a memory configured to: calculate a first power headroom report (PHR) for a half duplex (HD) operating mode; calculate a second PHR for a full duplex (FD) operating mode during which maximum uplink transmit power is subject to one or more self-interference constraints; determine whether to report the first PHR, the second PHR, or both; and report at least one of the first PHR or the second PHR to a network entity, in accordance with the determination.

Clause 28. An apparatus for wireless communications by a network entity, comprising: at least one processor and a memory configured to: determine whether a user equipment (UE) is to report a first power headroom report (PHR) for a half duplex (HD) operating mode, a second PHR for a full duplex (FD) operating mode during which maximum uplink transmit power is subject to one or more self-interference constraints, both; and monitor for at least one of the first PHR or the second PHR, in accordance with the determination.

Clause 29. A method for wireless communications by a user equipment, comprising: performing a full duplex (FD) uplink transmit power control, subject to one or more self-interference constraints, for transmissions to a network entity when the UE is operating in an FD mode; detecting an uplink power control condition related to the one or more self-interference constraints; and taking one or more actions to indicate the detection of the uplink power control condition to the network entity.

Clause 30. The method of Clause 29, wherein the performance of the FD uplink transmit power control comprises: determining an actual maximum uplink transmit power for the transmissions to the network entity when the UE is operating in the FD mode, said determination being based on at least one of a maximum uplink transmit power supported by the UE, a self-interference metric measured by the UE or a self-interference threshold.

Clause 31. The method of Clause 30, wherein the one or more self-interference constraints comprise at least one of the self-interference metric measured by the UE or the self-interference threshold.

Clause 32. The method of Clause 30, wherein the uplink power control condition is considered detected if at least one of: a difference between the maximum uplink transmit power supported by the UE and the actual maximum uplink transmit power equals to or exceeds a first threshold value; or an uplink signal quality metric, the value of which is impacted by at least one of the actual maximum uplink transmit power, the self-interference metric measured by the UE or the self-interference threshold, is equal to or less than a second threshold value.

Clause 33. The method of Clause 32, wherein the uplink signal quality metric is based on at least one of an uplink reference signal received power (RSRP) or an uplink path loss (PL).

Clause 34. The method of any one of Clauses 29-33, wherein the uplink power condition indicates an uplink quality degradation.

Clause 35. The method of any one of Clauses 29-34, further comprising receiving signaling, from the network entity, indicating at least one of the first and second threshold values.

Clause 36. The method of any one of Clauses 29-35, further comprising providing an indication of a cause of the uplink power control condition.

Clause 37. The method of Clause 36, wherein: a first value of the indication indicates the cause of the uplink power control condition related to a maximum permissible exposure (MPE); a second value of the indication indicates the cause of the uplink power control condition related to a full duplex self-interference; and a third value of the indication indicates the cause of the uplink power control condition related to the MPE and the full duplex self-interference.

Clause 38. The method of Clause 37, further comprising, if the indication of the cause is the third value: transmitting, to the network entity, an indication of at least one quantitative value of a metric reflective of the MPE and the full duplex self-interference.

Clause 39. The method of any of any one of Clauses 29-38, wherein the one or more actions comprise transmitting a power headroom report (PHR) indicating the detection of the uplink power control condition to the network entity.

Clause 40. The method of Clause 39, wherein the UE transmits the PHR on uplink resources configured for use by the UE in at least one of half duplex (HD) mode or FD mode for at least one of: an event triggered, a periodic, or an aperiodic uplink control information (UCI) conveyed via physical uplink control channel (PUCCH) or physical uplink shared channel (PUSCH); a UL granted resource triggered by a scheduling request conveyed via a medium access control (MAC) control element (MAC-CE); a contention free random access (CFRA) preamble transmission; or a contention based random access (CBRA) message transmission via a medium access control (MAC) control element (MAC-CE) that includes a reason code indicating a cause of the uplink power control condition.

Clause 41. The method of Clause 39, wherein the UE transmits the PHR on uplink resources configured for use by the UE in FD mode.

Clause 42. The method of Clause 39, wherein the UE transmits the PHR according to a transmit power configuration that involves at least one of: a transmit power control not subject to the one or more self-interference constraints; a boosted uplink transmit power; or uplink transmit power indicated via an uplink grant that also indicates uplink resources for transmitting the PHR.

Clause 43. The method of any one of Clauses 29-42, wherein: the network entity reserves uplink resources for use by the UE in FD mode for reporting purposes; and the one or more actions comprise refraining from transmitting, to the network entity, a report on the reserved uplink resources as an indication of the detection of the uplink power control condition.

Clause 44. The method of Clause 43, wherein the uplink resources are reserved for use by the UE in FD mode for periodic power headroom reporting.

Clause 45. The method of any one of Clauses 29-44, wherein: detecting an uplink power control condition related to the one or more self-interference constraints comprises detecting that a power headroom value calculated for a full duplex (FD) operating mode is equal to or less than a first threshold value; and taking one or more actions comprises sending, to the network entity, a request to abort the FD operating mode.

Clause 46. The method of Clause 45, wherein the request also requests a transfer to a half duplex (HD) operating mode.

Clause 47. The method of Clause 45, further comprising receiving, from the network entity, an indication of the first threshold value.

Clause 48. The method of Clause 45, wherein: the one or more self-interference constraints involve at least one of a self-interference metric value or a self-interference threshold value; and the request to abort the FD operating mode is sent if the self-interference metric value is equal to or greater than the self-interference threshold value.

Clause 49. A method for wireless communications by a network entity, comprising: configuring a user equipment (UE) for a full duplex (FD) operation including performing an uplink transmit power control subject to one or more self-interference constraints; determining the UE has detected an uplink power control condition related to the one or more self-interference constraints; and taking one or more actions based on the determination.

Clause 50. The method of Clause 49, wherein the network entity configures the UE to perform the FD uplink transmit power control by determining an actual maximum uplink transmit power for transmissions to the network entity when the UE is operating in an FD mode, said determination being based on at least one of a maximum uplink transmit power supported by the UE, a self-interference metric measured by the UE or a self-interference threshold.

Clause 51. The method of Clause 50, wherein the one or more self-interference constraints comprise at least one of the self-interference metric measured by the UE or the self-interference threshold.

Clause 52. The method of Clause 50, wherein the UE is configured to consider the uplink power control condition is detected if at least one of: a difference between the maximum uplink transmit power supported by the UE and the actual maximum uplink transmit power equals to or exceeds a first threshold value; or an uplink signal quality metric, the value of which is impacted by at least one of the actual maximum uplink transmit power, the self-interference metric measured by the UE or the self-interference threshold, is equal to or less than a second threshold value.

Clause 53. The method of any one of Clauses 49-52, wherein: detecting an uplink power control condition related to the one or more self-interference constraints comprises detecting that a power headroom value calculated for a full duplex (FD) operating mode is equal to or less than a first threshold value; and taking one or more actions comprises sending, to the network entity, a request to abort the FD operating mode.

Clause 54. The method of any one of Clauses 49-53, wherein the request also requests a transfer to a half duplex (HD) operating mode.

Clause 55. The method of any one of Clauses 49-54, further comprising receiving, from the network entity, an indication of the first threshold value.

Clause 56. The method of any one of Clauses 49-55, wherein: the one or more self-interference constraints involve at least one of a self-interference metric value or a self-interference threshold value; and the request to abort the FD operating mode is sent if the self-interference metric value is equal to or greater than the self-interference threshold value.

Clause 57. An apparatus for wireless communications by a user equipment, comprising: at least one processor and a memory configured to: perform a full duplex (FD) uplink transmit power control, subject to one or more self-interference constraints, for transmissions to a network entity when the UE is operating in an FD mode; detect an uplink power control condition related to the one or more self-interference constraints; and take one or more actions to indicate the detection of the uplink power control condition to the network entity.

Clause 58. An apparatus for wireless communications by a network entity, comprising: at least one processor and a memory configured to: configure a user equipment (UE) for a full duplex (FD) operation including performing an uplink transmit power control subject to one or more self-interference constraints; determine the UE has detected an uplink power control condition related to the one or more self-interference constraints; and take one or more actions based on the determination.

Additional Wireless Communication Network Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120 and/or processors 220, 230, 238, and/or controller/processor 240 of the BS 110 shown in FIG. 2 may be configured to perform operations 1100 of FIG. 11, operations 1200 of FIG. 12, operations 1300 of FIG. 13, operations 1400 of FIG. 14, operations 1500 of FIG. 15, and/or operations 1600 of FIG. 16.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for calculating, means for determining, means for monitoring, means for signaling, means for including, means for reporting and means for providing may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations and/or techniques described herein and illustrated in FIGS. 11-16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   calculating a first power headroom report (PHR) for a half duplex (HD) operating mode;
   calculating a second PHR for a full duplex (FD) operating mode during which maximum uplink transmit power is subject to one or more self-interference constraints;
   determining whether to report the first PHR, the second PHR, or both; and
   reporting at least one of the first PHR or the second PHR to a network entity, in accordance with the determination.

2. The method of claim 1, wherein the determination is based on an indication from the network entity.

3. The method of claim 2, wherein the indication is provided via at least one of a radio resource control (RRC) message, a medium access control (MAC) control element (MAC-CE), or a downlink control information (DCI) signaling.

4. The method of claim 1, wherein the determination is based on one or more PHR reporting rules defined in a standard specification.

5. The method of claim 1, wherein the determination is based on resources allocated per HD mode and FD mode.

6. The method of claim 5, wherein the determination is to, at least one of:
   report the first PHR in slots of the resources allocated for the HD operating mode; or
   report the second PHR in slots of the resources allocated for the FD operating mode.

7. The method of claim 1, wherein:
   the determination is to report either the first PHR or the second PHR; and
   the method further comprising including, in the report, a mode flag indicating an operating mode for the reported PHR.

8. The method of claim 1, wherein:
   the determination is to report both the first PHR and the second PHR regardless of whether a current operating mode is FD or HD.

9. The method of claim 1, wherein the determination is to:
   report the first PHR as a default report; and
   report the second PHR only when at least one conditions is met.

10. The method of claim 9, wherein the second PHR is reported as a value of a difference between the first PHR and the second PHR.

11. The method of claim 10, further comprising:
    receiving a threshold value via at least one of a radio resource control (RRC) message, a medium access control (MAC) control element (MAC-CE), or a downlink control information (DCI) signaling, wherein:
    the condition is that the value is equal to or above the threshold value.

12. The method of claim 10, wherein the condition is that in a current slot, resources are allocated for the FD operating mode.

13. The method of claim 1, further comprising, if the second PHR indicates a value that is equal to or less than a threshold value, sending, to a network entity, a request to abort the FD operating mode.

14. An apparatus for wireless communications by a user equipment (UE), comprising:
    memory; and
    at least one processor coupled with the memory and configured to:
      calculate a first power headroom report (PHR) for a half duplex (HD) operating mode;
      calculate a second PHR for a full duplex (FD) operating mode during which maximum uplink transmit power is subject to one or more self-interference constraints;
      determine whether to report the first PHR, the second PHR, or both; and
      report at least one of the first PHR or the second PHR to a network entity, in accordance with the determination.

* * * * *